United States Patent
Bi et al.

(10) Patent No.: US 12,396,015 B2
(45) Date of Patent: Aug. 19, 2025

(54) RESOURCE INDICATION METHOD AND COMMUNICATION DEVICE

(71) Applicant: HUAWEI TECHNOLOGIES CO., LTD., Shenzhen (CN)

(72) Inventors: Wenping Bi, Shenzhen (CN); Zheng Yu, Beijing (CN); Yubo Yang, Shanghai (CN); Yongqiang Fei, Shenzhen (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 588 days.

(21) Appl. No.: 17/672,160

(22) Filed: Feb. 15, 2022

(65) Prior Publication Data

US 2022/0174677 A1 Jun. 2, 2022

Related U.S. Application Data

(63) Continuation of application No. PCT/CN2019/101210, filed on Aug. 16, 2019.

(51) Int. Cl.
*H04W 72/53* (2023.01)
*H04W 28/26* (2009.01)
(Continued)

(52) U.S. Cl.
CPC .......... *H04W 72/53* (2023.01); *H04W 28/26* (2013.01); *H04W 72/0453* (2013.01); *H04W 72/20* (2023.01)

(58) Field of Classification Search
None
See application file for complete search history.

(56) References Cited

U.S. PATENT DOCUMENTS

2015/0327315 A1 11/2015 Xue et al.
2018/0049203 A1* 2/2018 Xue .................. H04L 5/0078
(Continued)

FOREIGN PATENT DOCUMENTS

CA 3034294 A1 3/2018
CN 102111893 A 6/2011
(Continued)

OTHER PUBLICATIONS

Intel Corporation: "Remaining details of UL data transmission procedures in NR", 3GPP Draft; R1-1720097, Nov. 18, 2017, XP051369778, total 10 pages.
(Continued)

*Primary Examiner* — Jay L Vogel
(74) *Attorney, Agent, or Firm* — HAUPTMAN HAM, LLP

(57) ABSTRACT

Embodiments of this application provide a resource indication method and a communication device. The resource indication method includes: A first communication device receives first information sent by a second communication device, where the first information is used to indicate a first resource pattern and indicate a reserved resource determined by using the first resource pattern, the first resource pattern is used to determine a position corresponding to each of N resource sets, and N is a positive integer greater than or equal to 1. The first communication device determines reserved resource based on the positions corresponding to the N resource sets and indicated by the first resource pattern, where the reserved resource is a resource unavailable to the first communication device. The first communication device determines not to transmit a signal by using the reserved resource.

13 Claims, 8 Drawing Sheets

(51) Int. Cl.
*H04W 72/0453* (2023.01)
*H04W 72/20* (2023.01)

(56) References Cited

U.S. PATENT DOCUMENTS

2018/0097673 A1* 4/2018 Nangia ................... H04L 5/001
2018/0359781 A1* 12/2018 Yoon ..................... H04W 16/14
2022/0216968 A1* 7/2022 Liu .................. H04W 72/0446

FOREIGN PATENT DOCUMENTS

| CN | 108464050 A | * | 8/2018 | ........... H04L 1/0038 |
| CN | 109802803 A | | 5/2019 | |
| WO | WO-2018031746 A1 | * | 2/2018 | |

OTHER PUBLICATIONS

VIVO: "Discussion on mode 1 resource allocation mechanism", 3GPP Draft; R1-1906138, May 13, 2019, KP051727594, total 13 pages.
Extended European Search Report issued in corresponding European Application No. 19942404.5, dated Jul. 18, 2022, pp. 1-8.
Nokia, Nokia Shanghai Bell, Coexistence of eMTC with NR. 3GPP TSG RAN WG1 Meeting #97, Reno, USA, May 13-17, 2019, R1-1906704, 5 pages.
NTT Docomo, Inc., Time-domain resource allocation. 3GPP TSG RAN WG1 Meeting #90, Prague, Czechia, Aug. 21-25, 2017, R1-1713949, 3 pages.
International Search Report issued in corresponding International Application No. PCT/CN2019/101210, dated May 20, 2020, pp. 1-9.
European Office Action issued in corresponding European Application No. 19942404.5, dated Oct. 8, 2024, pp. 1-7.

* cited by examiner

RESOURCE INDICATION METHOD AND COMMUNICATION DEVICE

CROSS-REFERENCE TO RELATED APPLICATIONS

This application is a continuation of International Application No. PCT/CN2019/101210, filed on Aug. 16, 2019, the disclosure of which is hereby incorporated by reference in its entirety.

TECHNICAL FIELD

Embodiments of this application relate to the communication field, and in particular, to a resource indication method and a communication device.

BACKGROUND

A new radio access technology (new radio access technology, NR) is used in a 5th generation wireless communication system. Compared with a long term evolution-advanced (long term evolution-advanced, LTE-A) system, the 5th generation wireless communication system using NR (which is referred to as an NR system for short) has a larger single-carrier bandwidth and a more flexible deployment frequency band. Although the NR system is to be commercially used, the LTE-A system continues to provide wireless communication services in a short term (or even a long term). Therefore, coexistence of the NR system and the LTE-A system becomes an important research point.

Because the LTE-A system still provides services, the LTE-A system continues to occupy an operating frequency band (for example, a frequency band near 1.8 GHz), and the NR system and the LTE-A system may coexist by sharing a spectrum. For example, when the NR system and the LTE-A system are deployed on a frequency band in a co-location (or inter-location) manner, some time-frequency resources on the frequency band may be used by an NR network device and NR user equipment (User Equipment, UE) or may be used by an LTE-A network device and LTE-A UE. When the NR network device and the NR UE use the time-frequency resource, the LTE-A network device and the LTE-A UE do not use the time-frequency resource, and vice versa.

For example, an enhanced machine type communication (enhanced Machine Type Communication, eMTC) system is a system derived from the LTE-A system, and the eMTC system may operate in the LTE-A system by using an LTE frequency band. To reduce power consumption and reduce costs, usually, an operating bandwidth of an eMTC terminal may be relatively small and is smaller than an operating bandwidth of the LTE-A system. For example, the operating bandwidth of the eMTC terminal may be a narrow band (narrow band, NB). One NB includes six consecutive physical resource blocks (physical resource blocks, PRBs), and one physical resource block includes 12 subcarriers (Subcarriers, SCs). When the eMTC system and the NR system operate together, the eMTC system operates on an NR frequency band. How to avoid interference between the eMTC system and the NR system is an important issue that needs to be considered.

In the NR system, there is a signal for which the LTE-A system needs to reserve a resource, for example, a synchronization signal block (synchronization signal block, SSB) used for time synchronization between a user and a network. In the NR system, a subcarrier spacing of the SSB may be 15 kHz, 30 kHz, 60 kHz, 120 kHz, or 240 kHz, and in the LTE-A system, the subcarrier spacing of the SSB is only 15 kHz. Correspondingly, in the NR system and the LTE-A system, the subcarrier spacing of the SSB varies in frequency domain, and a symbol length also varies in time domain.

Currently, a bitmap is used to indicate a reserved resource in the LTE-A system. In the NR system, a bitmap is used to indicate the reserved resource in both time domain and frequency domain. A granularity of the bitmap in time domain is a symbol, and a granularity of the bitmap in frequency domain is a resource block. If the bitmap in the LTE-A system is used to indicate the SSB, a great waste of resources is caused. If the time-frequency domain bitmap in the NR system is used to indicate the SSB, signaling overheads are excessively high.

SUMMARY

Embodiments of this application provide a resource indication method and a communication device, to reduce a waste of resources and reduce signaling overheads during resource indication.

To resolve the foregoing technical problem, the embodiments of this application provide the following technical solutions.

According to a first aspect, an embodiment of this application provides a resource indication method, including: A first communication device receives first information sent by a second communication device, where the first information is used to indicate a first resource pattern and indicate a reserved resource determined by using the first resource pattern, the first resource pattern is used to determine a position corresponding to each of N resource sets, and N is a positive integer greater than or equal to 1. The first communication device determines the reserved resource based on the positions corresponding to the N resource sets and indicated by the first resource pattern, where the reserved resource is a resource unavailable to the first communication device. The first communication device determines not to transmit a signal by using the reserved resource. In this embodiment of this application, after the second communication device determines the reserved resource, the second communication device may obtain the first information, and use the first information to indicate the first resource pattern, and may further use the first information to indicate the reserved resource determined by using the first resource pattern. The second communication device sends the first information to the first communication device, so that the first communication device can determine the first resource pattern and indicate the reserved resource determined by using the first resource pattern. Finally, the first communication device may transmit a signal without using the reserved resource. In this embodiment of this application, the first information sent by the second communication device indicates the first resource pattern, and the reserved resource is further determined by using the positions corresponding to the N resource sets indicated by the first resource pattern. In this embodiment of this application, the resource pattern is indicated, so that a waste of resources can be reduced, and signaling overheads during resource indication are reduced.

According to a second aspect, an embodiment of this application further provides a resource indication method, including: A second communication device determines a reserved resource, where the reserved resource is a resource indicated by the second communication device to a first communication device and unavailable to the first communication device. The second communication device determines first information, where the first information is used to indicate a first resource pattern and indicate the reserved resource determined by using the first resource pattern, the first resource pattern is used to determine a position corresponding to each of N resource sets, and N is a positive integer greater than or equal to 1. The second communication device sends the first information to the first communication device. In this embodiment of this application, after the second communication device determines the reserved resource, the second communication device may obtain the first information, and use the first information to indicate the first resource pattern, and may further use the first information to indicate the reserved resource determined by using the first resource pattern. The second communication device sends the first information to the first communication device, so that the first communication device can determine the first resource pattern and indicate the reserved resource determined by using the first resource pattern. Finally, the first communication device may transmit a signal without using the reserved resource. In this embodiment of this application, the first information sent by the second communication device indicates the first resource pattern, and the reserved resource is further determined by using the positions corresponding to the N resource sets indicated by the first resource pattern. In this embodiment of this application, the resource pattern is indicated, so that a waste of resources can be reduced, and signaling overheads during resource indication are reduced.

In a possible implementation of the first aspect or the second aspect, the first information includes first indication information and second indication information; the first indication information is used to indicate the first resource pattern; and the second indication information is used to indicate the reserved resource in the N resource sets indicated by the first resource pattern. The second communication device may obtain the first indication information and the second indication information. The first indication information has the following indication function: indicating the first resource pattern, and the second indication information has the following indication function: indicating the reserved resource in the N resource sets indicated by the first resource pattern. For example, if the first indication information carries the first resource pattern, the first communication device may determine the first resource pattern based on the first resource pattern carried by the first indication information. If the second indication information indicates the reserved resource in the N resource sets indicated by the first resource pattern, the first communication device is indicated to determine the reserved resource configured by the second communication device in the N resource sets indicated by the first resource pattern. For example, the first indication information and the second indication information may be transmitted by using different signaling, or the first indication information and the second indication information are transmitted by using same signaling.

In a possible implementation of the first aspect or the second aspect, when the first information indicates a first state, the first resource pattern indicates a first position corresponding to the N resource sets; and when the first information indicates a second state, the first resource pattern indicates a second position corresponding to the N resource sets. The first position and the second position refer to different positions in the resource set. For example, a quantity of bits of the first information is M, and M is an integer greater than or equal to 0. For example, M=1. The first state (for example, 0) indicates that the reserved resource is at the first position (for example, a case B) corresponding to the first resource pattern, and the second state (for example, 1) indicates that the reserved resource is at the second position (for example, a case C) corresponding to the first resource pattern. In this embodiment of this application, different positions corresponding to the first resource pattern may be determined based on different states of the first information, and different positions of the reserved resource are determined by indicating or defining different resource patterns. A position of the reserved resource is precisely defined and indicated, thereby avoiding a conflict problem caused by using a same position of a same resource set.

In a possible implementation of the first aspect or the second aspect, when the first information indicates a third state, the first resource pattern indicates a first position corresponding to the N resource sets; when the first information indicates a fourth state, the first resource pattern indicates a second position corresponding to the N resource sets; and when the first information indicates a fifth state, the first resource pattern indicates a third position corresponding to the N resource sets. The first position, the second position and the third position refer to different positions in the resource set. For example, a quantity of bits of the first information is M, and M is an integer greater than or equal to 0. For example, M=2. The third state (for example, 00) indicates that the reserved resource is at the first position (for example, a case B) corresponding to the first resource pattern, the fourth state (for example, 01) indicates that the reserved resource is at the second position (for example, a case C) corresponding to the first resource pattern, and the fifth state (for example, 10) indicates that the reserved resource is at the third position (for example, a case A) corresponding to the first resource pattern. In this embodiment of this application, different positions corresponding to the first resource pattern may be determined based on different states of the first information, and different positions of the reserved resource are determined by indicating or defining different resource patterns. A position of the reserved resource is precisely defined and indicated, thereby avoiding a conflict problem caused by using a same position of a same resource set.

In a possible implementation of the first aspect or the second aspect, when the first information indicates a sixth state, the first resource pattern indicates that the reserved resource does not exist in the N resource sets. For the first communication device, the resource may be used for signal transmission. Whether the reserved resource exists may be indicated by using different states of the first information, so that the first communication device may determine whether to use the resource indicated by the second communication device.

In a possible implementation of the first aspect or the second aspect, when a frequency range applicable to the first resource pattern is less than or equal to a first frequency value, the first position is {2, 4, 8, 10}+14n, where n=0, and {2, 4, 8, 10} indicates that a value is 2, 4, 8, or 10; or when the frequency range is greater than the first frequency value, the first position is {2, 4, 8, 10}+14n, where n=0 or 1, and {2, 4, 8, 10} indicates that a value is 2, 4, 8, or 10. For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

In a possible implementation of the first aspect or the second aspect, when a frequency range applicable to the first resource pattern is less than or equal to a first frequency value, the first position is {2, 8}+14n, where n=0, and {2, 8} indicates that a value is 2 or 8; or when the frequency range is greater than the first frequency value, the first position is {2, 8}+14n, where n=0 or 1, and {2, 8} indicates that a value is 2 or 8. For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

In a possible implementation of the first aspect or the second aspect, the first position is {2, 16}, where {2, 16} indicates that a value is 2 or 16. The value of the first position is fixed to 2 or 16, thereby resolving a problem that the first position cannot be accurately indicated when time domain symbol lengths are different due to different subcarrier spacings. Each reserved resource includes M symbols in time domain, for example, M=10, and a number of the $1^{st}$ symbol of the reserved resource is {2, 16}. The symbol number is a symbol number in the time unit.

In a possible implementation of the first aspect or the second aspect, when a frequency range applicable to the first resource pattern is less than or equal to a first frequency value, the second position is {1, 4}+7n, where n=0 or 1, and {1, 4} indicates that a value is 1 or 4; or when the frequency range is greater than the first frequency value, the second position is {1, 4}+7n, where n=0, 1, 2, or 3, and {1, 4} indicates that a value is 1 or 4. For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

In a possible implementation of the first aspect or the second aspect, when a frequency range applicable to the first resource pattern is less than or equal to a first frequency value, the third position is {2, 8}+14n, where n=0 or 1, and {2, 8} indicates that a value is 2 or 8; or when the frequency range is greater than the first frequency value, the third position is {2, 8}+14n, where n=0, 1, 2, or 3, and {2, 8} indicates that a value is 2 or 8. For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

In a possible implementation of the first aspect or the second aspect, when a frequency range applicable to the first resource pattern is less than or equal to a first frequency value, the third position is {2, 16}+28n, where n=0, and {2, 16} indicates that a value is 2 or 16; or when the frequency range is greater than the first frequency value, the third position is {2, 16}+28n, where n=0 or 1, and {2, 16} indicates that a value is 2 or 16. For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

In a possible implementation of the first aspect or the second aspect, the first information further includes one or more of the following information: period information, offset information, and subcarrier spacing information; the period information is used to indicate a period value corresponding to the first resource pattern; the offset information is used to indicate an offset value of the position corresponding to each resource set; and the subcarrier spacing information is used to indicate a subcarrier spacing corresponding to each resource set. The period information, the offset information, and the subcarrier spacing information may be independent of the foregoing first indication information and the foregoing second indication information. That is, the period information, the offset information, and the subcarrier spacing information and the foregoing first indication information and the foregoing second indication information are transmitted by using different information. The period information is used to indicate a period applicable to the resource pattern corresponding to the reserved resource. Optionally, the period may include two pieces of period information, and are respectively applied to different resource reservation cases. For example, different period values may be used for an SSB and a coreset. The offset information is used to indicate the offset value of the position corresponding to each resource set or an offset of the first resource pattern. For example, the offset information indicates an offset value of a candidate start time position. The offset information is used to indicate the offset value of the position corresponding to each resource set, thereby resolving an offset problem caused by misalignment of subframe boundaries in an LTE-A system and an NR system, and precisely configuring the reserved resource. The subcarrier spacing information may indicate that the subcarrier spacing is 15 kHz or 30 kHz. For example, the subcarrier spacing information is 1 bit, the first state (for example, 0) indicates that the subcarrier spacing is 15 kHz, and the second state (for example, 1) indicates that the subcarrier spacing is 30 kHz.

According to a third aspect, an embodiment of this application provides a communication device. The communication device is specifically a first communication device, and the first communication device includes a processing module and a transceiver module. The transceiver module is configured to receive first information sent by a second communication device, where the first information is used to indicate a first resource pattern and indicate a reserved resource determined by using the first resource pattern, the first resource pattern is used to determine a position corresponding to each of N resource sets, and N is a positive integer greater than or equal to 1. The processing module is configured to determine the reserved resource based on the positions corresponding to the N resource sets and indicated by the first resource pattern, where the reserved resource is a resource unavailable to the first communication device. The processing module is configured to determine not to transmit a signal by using the reserved resource.

In the third aspect of this application, the modules constituting the first communication device may further perform the steps described in the first aspect and the possible implementations. For details, refer to the descriptions of the first aspect and the possible implementations.

According to a fourth aspect, an embodiment of this application provides a communication device. The communication device is specifically a second communication device, and the second communication device includes a processing module and a transceiver module. The processing module is configured to determine a reserved resource, where the reserved resource is a resource indicated by the second communication device to a first communication device and unavailable to the first communication device. The processing module is configured to determine first information, where the first information is used to indicate a first resource pattern and indicate the reserved resource determined by using the first resource pattern, the first resource pattern is used to determine a position corresponding to each of N resource sets, and N is a positive integer greater than or equal to 1. The transceiver module is configured to send the first information to the first communication device.

In the fourth aspect of this application, the modules constituting the second communication device may further perform the steps described in the second aspect and the possible implementations. For details, refer to the descriptions of the second aspect and the possible implementations.

In a possible implementation of the third aspect or the fourth aspect, the first information includes first indication information and second indication information; the first indication information is used to indicate the first resource pattern; and the second indication information is used to indicate the reserved resource in the N resource sets indicated by the first resource pattern.

In a possible implementation of the third aspect or the fourth aspect, when the first information indicates a first state, the first resource pattern indicates a first position corresponding to the N resource sets; and when the first information indicates a second state, the first resource pattern indicates a second position corresponding to the N resource sets.

In a possible implementation of the third aspect or the fourth aspect, when the first information indicates a third state, the first resource pattern indicates a first position corresponding to the N resource sets; when the first information indicates a fourth state, the first resource pattern indicates a second position corresponding to the N resource sets; and when the first information indicates a fifth state, the first resource pattern indicates a third position corresponding to the N resource sets.

In a possible implementation of the third aspect or the fourth aspect, when the first information indicates a sixth state, the first resource pattern indicates that the reserved resource does not exist in the N resource sets.

In a possible implementation of the third aspect or the fourth aspect, when a frequency range applicable to the first resource pattern is less than or equal to a first frequency value, the first position is $\{2, 4, 8, 10\}+14n$, where $n=0$, and $\{2, 4, 8, 10\}$ indicates that a value is 2, 4, 8, or 10; or when the frequency range is greater than the first frequency value, the first position is $\{2, 4, 8, 10\}+14n$, where $n=0$ or 1, and $\{2, 4, 8, 10\}$ indicates that a value is 2, 4, 8, or 10.

In a possible implementation of the third aspect or the fourth aspect, when a frequency range applicable to the first resource pattern is less than or equal to a first frequency value, the first position is $\{2, 8\}+14n$, where $n=0$, and $\{2, 8\}$ indicates that a value is 2 or 8; or when the frequency range is greater than the first frequency value, the first position is $\{2, 8\}+14n$, where $n=0$ or 1, and $\{2, 8\}$ indicates that a value is 2 or 8.

In a possible implementation of the third aspect or the fourth aspect, the first position is $\{2, 16\}$, where $\{2, 16\}$ indicates that a value is 2 or 16.

In a possible implementation of the third aspect or the fourth aspect, when a frequency range applicable to the first resource pattern is less than or equal to a first frequency value, the second position is $\{1, 4\}+7n$, where $n=0$ or 1, and $\{1, 4\}$ indicates that a value is 1 or 4; or when the frequency range is greater than the first frequency value, the second position is $\{1, 4\}+7n$, where $n=0, 1, 2,$ or 3, and $\{1, 4\}$ indicates that a value is 1 or 4.

In a possible implementation of the third aspect or the fourth aspect, when a frequency range applicable to the first resource pattern is less than or equal to a first frequency value, the third position is $\{2, 8\}+14n$, where $n=0$ or 1, and $\{2, 8\}$ indicates that a value is 2 or 8; or when the frequency range is greater than the first frequency value, the third position is $\{2, 8\}+14n$, where $n=0, 1, 2,$ or 3, and $\{2, 8\}$ indicates that a value is 2 or 8.

In a possible implementation of the third aspect or the fourth aspect, when a frequency range applicable to the first resource pattern is less than or equal to a first frequency value, the third position is $\{2, 16\}+28n$, where $n=0$, and $\{2, 16\}$ indicates that a value is 2 or 16; or when the frequency range is greater than the first frequency value, the third position is $\{2, 16\}+28n$, where $n=0$ or 1, and $\{2, 16\}$ indicates that a value is 2 or 16.

In a possible implementation of the third aspect or the fourth aspect, the first information further includes one or more of the following information: period information, offset information, and subcarrier spacing information; the period information is used to indicate a period value corresponding to the first resource pattern; the offset information is used to indicate an offset value of the position corresponding to each resource set; and the subcarrier spacing information is used to indicate a subcarrier spacing corresponding to each resource set.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the computer program product is run on a computer, the computer is enabled to perform the method according to the first aspect or the second aspect.

According to a seventh aspect, an embodiment of this application provides a communication device. The communication device may include an entity, for example, a terminal device or a network device. The communication device includes a processor and a memory. The memory is configured to store instructions. The processor is configured to execute the instructions in the memory, to enable the communication device to perform the method according to the first aspect or the second aspect.

According to an eighth aspect, an embodiment of this application provides a chip system. The chip system includes a processor, configured to support a communication device implementing functions according to the foregoing aspects, for example, sending or processing data and/or information in the foregoing method. In a possible design, the chip system further includes a memory. The memory is configured to store program instructions and data that are necessary for the communication device. The chip system may include a chip, or may include a chip and another discrete component.

DESCRIPTION OF EMBODIMENTS

Figure 1:
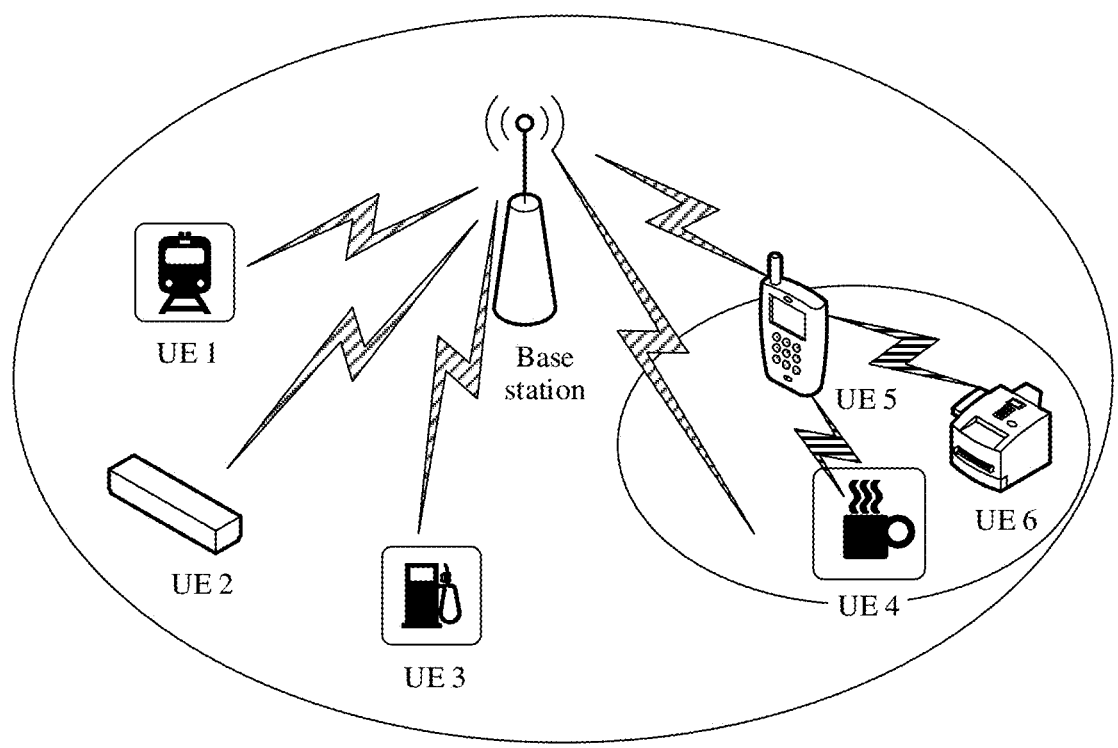
FIG. 1 is a schematic architectural diagram of a system of a resource indication method according to an embodiment of this application.

Embodiments of this application provide a resource indication method and a communication device, to reduce a waste of resources and reduce signaling overheads during resource indication.

The following describes the embodiments of this application with reference to the accompanying drawings.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "have", and any other variations thereof are intended to cover a non-exclusive inclusion, so that a process, method, system, product, or device that includes a series of units is not limited to those units, but may include other units not expressly listed or inherent to such a process, method, product, or device.

The technical solutions in the embodiments of this application may be applied to various communication systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency-division multiple access, OFDMA) system, a single-carrier frequency division multiple access (single carrier FDMA, SC-FDMA) system, and other systems. Terms "system" and "network" may be interchanged with each other. The CDMA system may implement wireless technologies such as universal terrestrial radio access (universal terrestrial radio access, UTRA) and CDMA2000. The UTRA may include a wideband CDMA (wideband CDMA, WCDMA) technology and another variant technology of CDMA. CDMA2000 may cover the interim standard (interim standard, IS) 2000 (IS-2000), the IS-95 standard, and the IS-856 standard. The TDMA system may implement wireless technologies such as a global system for mobile communications (global system for mobile communication, GSM). The OFDMA system may implement wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in long term evolution (long term evolution, LTE) and various versions evolved based on LTE in 3GPP. A 5th generation (5th Generation, "5G" for short) communication system or new radio (New Radio, "NR" for short) is a next generation communication system under study. The technical solutions in the embodiments of this application may be applied to various communication systems such as V2X, LTE-V, V2V, the Internet of Vehicles, MTC, the IoT, LTE-M, M2M, and the Internet of Things. In addition, the communication system is further applicable to a future-oriented communication technology, and is applicable to the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

The communication system provided in the embodiments of this application may include a first communication device and a second communication device, and data transmission may be performed between the first communication device and the second communication device. For example, the first communication device may include a terminal device, and the second communication device may include a network device. Alternatively, the first communication device may include one terminal device, and the second communication device may include another terminal device. Alternatively, the first communication device may include one network device, and the second communication device may include another network device.

In this application, transmission may be sending or receiving. When one side of the communication performs sending, a peer device of the communication performs receiving. A TB may be a TB for uplink transmission, or may be a TB for downlink transmission.

FIG. 1 is a schematic diagram of a structure of a possible radio access network (radio access network, RAN) according to an embodiment of this application. The RAN may be a base station access system in a 2G network (to be specific, the RAN includes a base station and a base station controller), a base station access system in a 3G network (to be specific, the RAN includes a base station and an RNC), a base station access system in a 4G network (to be specific, the RAN includes an eNB and an RNC), or a base station access system in a 5G network.

The RAN includes one or more network devices. The network device may be any device having a wireless transceiver function, or a chip disposed in a device having a wireless transceiver function. The network device includes but is not limited to a base station (for example, a base station BS, a NodeB NodeB, an evolved NodeB eNodeB or eNB, a gNodeB gNodeB or a gNB in a 5th generation 5G communication system, a base station in a future communication system, an access node in a Wi-Fi system, a wireless relay node, or a wireless backhaul node) and the like. The base station may be a macro base station, a micro base station, a pico base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (transmission receiving points, TRPs). The network device may alternatively be a radio controller, a centralized unit (centralized unit, CU), a distributed unit (distributed unit, DU), or the like in a cloud radio access network (cloud radio access network, CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting the 5G network, or may support a dual connection to a base station in an LTE network and a base station in the 5G network. For example, the terminals are connected to a RAN node of a wireless network. Currently, for example, the RAN node is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, a home evolved NodeB or a home NodeB, HNB), a baseband unit (baseband unit, BBU), or a wireless fidelity (wireless fidelity, Wi-Fi) access point (access point, AP). In a network structure, the network device may include a centralized unit (centralized unit, CU) node, a distributed unit (distributed unit, DU) node, or a RAN device including a CU node and a DU node.

The terminal devices 1 to 6 each are also referred to as user equipment (user equipment, UE), a mobile station (mobile station, MS), a mobile terminal (mobile terminal, MT), a terminal, or the like, and is a device that provides voice and/or data connectivity for a user, or is a chip disposed in the device, for example, a handheld device or a vehicle-mounted device having a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home). The terminal device provided in the embodiments of this application may be a low-complexity terminal device and/or a terminal device in a coverage enhancement mode A.

In the embodiments of this application, the base station and UE 1 to UE 6 form a communication system, and in the communication system, the base station sends one or more of system information, a RAR message, and a paging message to one or more of the UE 1 to the UE 6. In addition, the UE 4 to the UE 6 also form a communication system, and in the communication system, the UE 5 may function as a base station, and the UE 5 may send one or more of system information, control information, and a paging message to one or more of the UE 4 and the UE 6.

In the embodiments of this application, when a subcarrier spacing of an SSB is 15 kHz, the SSB occupies a maximum of four symbols in time domain. If a bitmap of the LTE-A system is used to indicate a valid subframe or an invalid subframe (one subframe includes 14 symbols), a great waste of resources is caused. In addition, if a time-frequency domain bitmap in the NR system is used for indication, signaling overheads are excessively high, and a structure of the SSB is relatively fixed; therefore, there is no need to introduce excessive flexibility.

In the embodiments of this application, a control resource set (control resource set, coreset) is used to indicate a time-frequency resource used by a physical downlink control channel (physical downlink control channel, PDCCH) in the NR system. All resource blocks (resource blocks, RBs) are divided into a plurality of groups in frequency domain based on every six RBs, and usage states of the plurality of groups of RBs in an entire bandwidth are indicated by using a bitmap, and the control resource set may occupy one symbol, two consecutive symbols, or three consecutive symbols in the time, and a start position of the PDCCH in each slot is indicated by the base station by using signaling. The coreset occupies a maximum of three symbols in time domain. If the bitmap of the LTE-A system is used to indicate a valid subframe or an invalid subframe (one subframe includes 14 symbols), a great waste of resources is caused. In addition, if the time-frequency domain bitmap in the NR system is used for indication, signaling overheads are excessively high, and a structure of the coreset is relatively fixed; therefore, there is no need to introduce excessive flexibility. Therefore, in the embodiments of this application, a reserved resource is indicated in the LTE system, and the reserved resource may be used for the SSB and the coreset in the NR system, to optimize signaling overheads and resource indication flexibility.

It may be understood that, in addition to being used for the SSB and the coreset in the NR system, the reserved resource may be used for other reservation types (or reservation manners). For example, the reserved resource may be further used for NR data, or may be used for ultra-reliable low-latency communication (ultra reliable low latency communication, uRLLC) data. Herein, the reservation type of the reserved resource is merely an example, and is not intended to limit the embodiments of this application.

Figure 2:
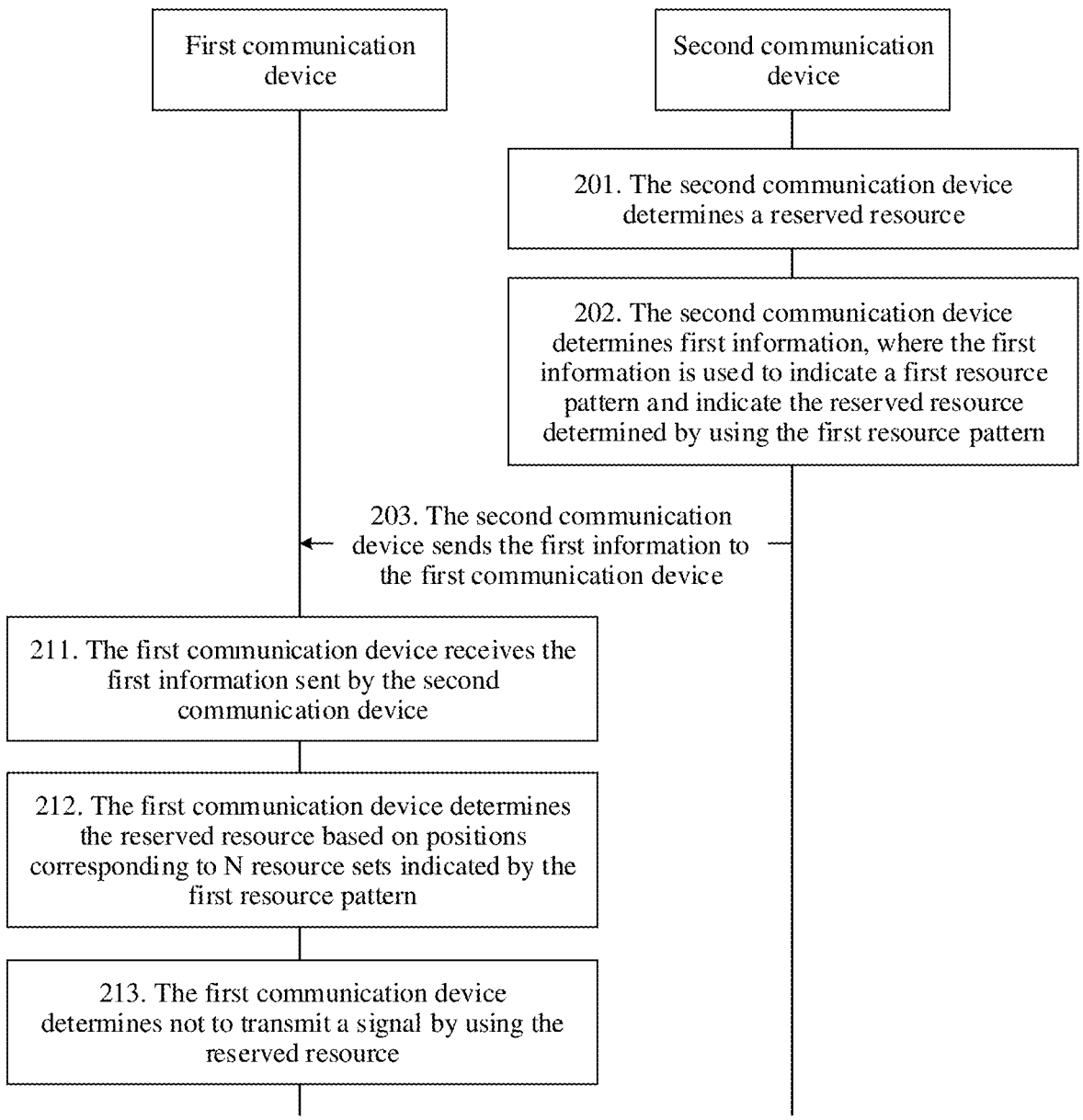
FIG. 2 is a schematic diagram of an interaction process between a first communication device and a second communication device according to an embodiment of this application.

For example, the first communication device may be the foregoing terminal device, and the second communication device may be the foregoing network device. The second communication device may send first information to the first communication device, where the first information is used to indicate a first resource pattern and indicate a first resource determined by using the first resource pattern. The first communication device receives the first information. The first communication device determines the first resource based on the first information. The first resource is at least one of the following resources: a reserved resource, an available resource, an unavailable resource, a resource needs to be rate-matched, a resource needs to be punctured, or a resource needs to be dropped. The reserved resource is a resource reserved by the second communication device and unavailable to the first communication device. The available resource is a non-reserved resource, and the available resource is a resource that the second communication device indicates to the first communication device and the first communication device can use. The resource that needs to be rate-matched indicates a user to perform rate matching (rate matching) on the resource, that is, the resource is not calculated during calculation of a transmission resource, and a symbol should not be set on the resource during mapping. The resource that needs to be punctured means that a symbol carried on the resource is punctured and not transmitted, and the meaning of puncturing is similar to that of dropping (drop). The following uses the first resource as a reserved resource as an example for description. First, FIG. 2 is a schematic diagram of an interaction process between a first communication device and a second communication device according to an embodiment of this application. For a resource indication method provided in an embodiment of this application, the subsequent step 201 to step 203 are described in detail from a side of the second communication device, and the subsequent step 211 to step 213 are described from a side of the first communication device. The method mainly includes the following steps.

201. The second communication device determines a reserved resource, where the reserved resource is a resource indicated by the second communication device to the first communication device and unavailable to the first communication device.

In this embodiment of this application, the second communication device first determines the reserved resource. The second communication device determines a resource unavailable to the first communication device as the reserved resource. The reserved resource may be a resource included in one or more of N resource sets. For example, the reserved resource may be determined by using a position corresponding to the resource set, and the position may also be referred to as a candidate position. For example, the position corresponding to the resource set may include a candidate start time and/or a candidate frequency position.

In this embodiment of this application, one resource set includes one or more resource units, and the resource unit includes a time unit, for example, the time unit may be a symbol, a slot, a subframe, or a frame. The resource unit may further include frequency domain unit, for example, the frequency domain unit may be a subcarrier, a resource block, or a narrowband. Specifically, an implementation of the resource unit may be determined based on an application scenario.

202. The second communication device determines first information, where the first information is used to indicate a first resource pattern and indicate the reserved resource determined by using the first resource pattern, the first resource pattern is used to determine a position corresponding to each of N resource sets, and N is a positive integer greater than or equal to 1.

In this embodiment of this application, after the second communication device determines the reserved resource, the second communication device may determine the first information, and use the first information to indicate the first resource pattern, and may further use the first information to indicate the reserved resource determined by using the first resource pattern. For example, the first information may include one piece of information. For example, the first information may be sent by using downlink control signaling, or the first information may be sent by using higher layer signaling. The first information includes one or more fields, and the field included in the first information is used to indicate the first resource pattern and indicate the reserved resource determined by using the first resource pattern. For another example, the first information may specifically refer to a plurality of pieces of indication information, and the plurality of pieces of indication information may be sent by using same information, or may be sent by using different pieces of information. For example, one piece of indication information is sent by using higher layer signaling, and another piece of indication information is sent by using downlink control information. The plurality of pieces of indication information may indicate the first resource pattern, and further indicate the reserved resource determined by using the first resource pattern. Through joint indication of the plurality of pieces of indication information, the first communication device may determine the first resource pattern and indicate the reserved resource determined by using the first resource pattern. For example, the first information is two pieces of indication information, first indication information indicates the first resource pattern, and second indication information indicates a resource that needs to be reserved in the first resource pattern. The first indication information and the second indication information may be sent by using same information or signaling, or may be sent by using different information or signaling. For example, the first indication information is sent by using higher layer signaling, and the second indication information is sent by using downlink control information, or both the first indication information and the second indication information are sent by using downlink control information, or the first indication information and the second indication information are sent by using different information of higher layer signaling, or the first indication information and the second indication information are sent by using same indication information of higher layer signaling.

In this embodiment of this application, the resource pattern may be used to determine the position corresponding to the resource set. The position may include a candidate time position and/or frequency position. The resource pattern may be used to determine a position corresponding to a specific resource set in different scenarios. For example, the resource pattern may be a case A, a case B, or a case C. The case A is for a scenario with a subcarrier spacing of 15 kHz, and the case B and the case C are for a scenario with a subcarrier spacing of 30 kHz, but the case B and the case C are two different patterns. In this embodiment of this application, the first information may indicate the first resource pattern, the first resource pattern is used to determine the position corresponding to each of the N resource sets, and N is a positive integer greater than or equal to 1. That is, the first resource pattern may be used to determine a position corresponding to each of one or more resource sets.

In some embodiments of this application, the first information is used to indicate the first resource pattern in a first time period and indicate the reserved resource determined by using the first resource pattern. For example, the first time period is half a subframe. In addition, the position corresponding to the resource set in this embodiment of this application may be referred to as a candidate position, and the candidate position includes a candidate start time and a candidate frequency position. For example, the position may be a number of the $1^{st}$ symbol in each resource set. For example, a symbol numbered 0 is the $1^{st}$ symbol in a half frame.

203. The second communication device sends the first information to the first communication device.

In this embodiment of this application, the second communication device determines the reserved resource through the foregoing step 201, and determines the first information through the foregoing step 202, and then the second communication device sends the first information to the first communication device. The first information may be used to indicate the first resource pattern and indicate the reserved resource determined by using the first resource pattern. For an indication manner of the first information, refer to detailed descriptions of the first information in the following content.

In some embodiments of this application, the first information includes first indication information and second indication information; the first indication information is used to indicate the first resource pattern; and the second indication information is used to indicate the reserved resource in the N resource sets indicated by the first resource pattern.

The second communication device may obtain the first indication information and the second indication information. The first indication information has the following indication function: indicating the first resource pattern, and the second indication information has the following indication function: indicating the reserved resource in the N resource sets indicated by the first resource pattern. For example, if the first indication information carries the first resource pattern, the first communication device may determine the first resource pattern based on the first resource pattern carried by the first indication information. If the second indication information indicates the reserved resource in the N resource sets indicated by the first resource pattern, the first communication device is indicated to determine the reserved resource configured by the second communication device in the N resource sets indicated by the first resource pattern. For example, the first indication information and the second indication information may be transmitted by using different signaling, or the first indication information and the second indication information are transmitted by using same signaling. This is not limited herein.

In some embodiments of this application, the first information further includes one or more of the following information: period information, offset information, and subcarrier spacing information;

the period information is used to indicate a period value corresponding to the first resource pattern;

the offset information is used to indicate an offset value of the position corresponding to each resource set; and the subcarrier spacing information is used to indicate a subcarrier spacing corresponding to each resource set.

The period information, the offset information, and the subcarrier spacing information may be independent of the foregoing first indication information and the foregoing second indication information. That is, the period information, the offset information, and the subcarrier spacing information and the foregoing first indication information and the foregoing second indication information are transmitted by using different information.

The period information is used to indicate a period applicable to the resource pattern corresponding to the reserved resource. Optionally, the period may include two pieces of period information, and are respectively applied to different resource reservation cases. For example, different period values may be used for an SSB and a coreset.

The offset information is used to indicate the offset value of the position corresponding to each resource set or an offset of the first resource pattern. For example, the offset information indicates an offset value of a candidate start time position. The offset information is used to indicate the offset value of the position corresponding to each resource set, thereby resolving an offset problem caused by misalignment of subframe boundaries in an LTE-A system and an NR system, and precisely configuring the reserved resource. For example, if the offset information indicates a first offset value, the first offset value may be an offset value of the $1^{st}$ symbol number of the reserved resource. The first offset value indicates the offset value of the $1^{st}$ symbol number of the reserved resource based on a first unit, and the first unit includes a symbol, a subframe, a slot, a frame, and the like. For example, the offset value indicated by the first offset value is x symbols, and the $1^{st}$ symbol number of the reserved resource is mod($\{2, 8\}+14n+x, 70$), where n=0, 1, 2, or 3, or n=0 or 1, where mod(a, b) is a modulo operation, and a result is a remainder of a divided by b. For another example, the $1^{st}$ symbol number of the reserved resource is mod($\{2, 4, 8, 10\}+14n+x, 70$), where n=0, or n=0 or 1. For another example, the $1^{st}$ symbol number of the reserved resource is mod($\{1, 4\}+7n+x, 70$), where n=0 or 1, or n=0, 1, 2, or 3. It should be noted that the symbol numbered 0 is the $1^{st}$ symbol of the $1^{st}$ subframe or the $1^{st}$ slot in a half frame.

The subcarrier spacing information may indicate that the subcarrier spacing is 15 kHz or 30 kHz. For example, the subcarrier spacing information is 1 bit, the first state (for example, 0) indicates that the subcarrier spacing is 15 kHz, and the second state (for example, 1) indicates that the subcarrier spacing is 30 kHz. Optionally, the subcarrier spacing is a subcarrier spacing in an NR system.

211. The first communication device receives the first information sent by the second communication device, where the first information is used to indicate the first resource pattern and indicate the reserved resource determined by using the first resource pattern, the first resource pattern is used to determine the position corresponding to each of the N resource sets, and N is a positive integer greater than or equal to 1.

In this embodiment of this application, the first communication device and the second communication device may communicate with each other. For example, the first communication device may receive the first information sent by the second communication device. For example, the first information may include one piece of information, or the first information may be downlink control signaling. The first information includes one or more fields, and the field included in the first information is used to indicate the first resource pattern and indicate the reserved resource determined by using the first resource pattern. For another example, the first information may specifically refer to a plurality of pieces of indication information, and the plurality of pieces of indication information may indicate the first resource pattern, and further indicate the reserved resource determined by using the first resource pattern. Through joint indication of the plurality of pieces of indication information, the first communication device may determine the first resource pattern and indicate the reserved resource determined by using the first resource pattern.

In this embodiment of this application, the first information may further indicate the reserved resource, or the first information may further indicate the reserved resource by using the first resource pattern, for example, indicate whether the N resource sets have the reserved resource. For example, if a bitmap is 1, it indicates that the reserved resource exists. If a bitmap is 0, it indicates that the reserved resource does not exist. In addition, optionally, the foregoing first indication information may be used to indicate the first resource pattern, and the foregoing second indication information may be used to indicate, by using the bitmap, whether the reserved resource exists.

In this embodiment of this application, the resource pattern may be used to determine the position corresponding to the resource set. The position may include a candidate time position and/or frequency position. The resource pattern may be used to determine a position corresponding to a specific resource set in different scenarios. For example, the resource pattern may be a case A, a case B, or a case C. The case A is for a scenario with a subcarrier spacing of 15 kHz, and the case B and the case C are for a scenario with a subcarrier spacing of 30 kHz, but the case B and the case C are two different patterns. In this embodiment of this application, the first information may indicate the first resource pattern, the first resource pattern is used to determine the position corresponding to each of the N resource sets, and N is a positive integer greater than or equal to 1. That is, the first resource pattern may be used to determine a position corresponding to each of one or more resource sets.

In some embodiments of this application, the first information may have at least two states: a first state and a second state. In this case, the first information indicates, by using different states, different positions corresponding to the first resource pattern. For example, when the first information indicates the first state, the first resource pattern indicates a first position corresponding to the N resource sets, and when the first information indicates the second state, the first resource pattern indicates a second position corresponding to the N resource sets. The first position and the second position refer to different positions in the resource set. For example, a quantity of bits of the first information is M, and M is an integer greater than or equal to 0. For example, M=1. The first state (for example, 0) indicates that the reserved resource is at the first position (for example, the case B) corresponding to the first resource pattern, and the second state (for example, 1) indicates that the reserved resource is at the second position (for example, the case C) corresponding to the first resource pattern. In this embodiment of this application, different positions corresponding to the first resource pattern may be determined based on different states of the first information, and different positions of the reserved resource are determined by indicating or defining different resource patterns. A position of the reserved resource is precisely defined and indicated, thereby avoiding a conflict problem caused by using a same position of a same resource set.

In some embodiments of this application, the first information may have at least three states: a third state, a fourth state, and a fifth state. In this case, the first information indicates, by using different states, different positions corresponding to the first resource pattern. For example, when the first information indicates the third state, the first resource pattern indicates a first position corresponding to the N resource sets; when the first information indicates the fourth state, the first resource pattern indicates a second position corresponding to the N resource sets; and when the first information indicates the fifth state, the first resource pattern indicates a third position corresponding to the N resource sets. The first position, the second position and the third position refer to different positions in the resource set. For example, a quantity of bits of the first information is M, and M is an integer greater than or equal to 0. For example, M=2. The third state (for example, 00) indicates that the reserved resource is at the first position (for example, the case B) corresponding to the first resource pattern, the fourth state (for example, 01) indicates that the reserved resource is at the second position (for example, the case C) corresponding to the first resource pattern, and the fifth state (for example, 10) indicates that the reserved resource is at the third position (for example, the case A) corresponding to the first resource pattern. In this embodiment of this application, different positions corresponding to the first resource pattern may be determined based on different states of the first information, and different positions of the reserved resource are determined by indicating or defining different resource patterns. A position of the reserved resource is precisely defined and indicated, thereby avoiding a conflict problem caused by using a same position of a same resource set.

Further, in some embodiments of this application, when the first information occupies two bits, the first information may further indicate a sixth state. When the first information indicates the sixth state, the first resource pattern indicates that the reserved resource does not exist in the N resource sets. That is, when the first information indicates the sixth state, the first resource pattern indicates no reserved resource. That is, for the first communication device, the resource may be used for signal transmission. Whether the reserved resource exists may be indicated by using different states of the first information, so that the first communication device may determine whether to use the resource indicated by the second communication device.

In some embodiments of this application, there are a plurality of implementations for the first position corresponding to the N resource sets. For example, there are different implementations for a value of the first position depending on whether a frequency range applicable to the first resource pattern exceeds a first frequency value. For example, the first frequency value may be 3 GHz, or may be another frequency value. This is not limited herein. The frequency range applicable to the first resource pattern may be a frequency range in which a system operates. When the frequency range applicable to the first resource pattern is less than or equal to the first frequency value, the first position is $\{2, 4, 8, 10\}+14n$, where n=0, and $\{2, 4, 8, 10\}$ indicates that a value is 2, 4, 8, or 10; or when the frequency range is greater than the first frequency value, the first position is $\{2, 4, 8, 10\}+14n$, where n=0 or 1, and $\{2, 4, 8, 10\}$ indicates that a value is 2, 4, 8, or 10.

For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

For example, a quantity of first time units included in each of eight resource sets is 2. For example, the first resource pattern falls within the case B, and in one time unit, for example, 5 ms, five subframes, or one half frame, there are one or more time domain positions of the reserved resource. Each reserved resource includes M symbols in time domain, for example, M=2, and a number of the $1^{st}$ start symbol of the reserved resource is $\{2, 4, 8, 10\}+14n$. If a frequency range is less than or equal to 3 GHz, and n=0, a number of the $1^{st}$ symbol of the reserved resource is $\{2, 4, 8, 10\}$. Alternatively, if the frequency range is greater than 3 GHz and less than 6 GHz, and n=0 or 1, a number of the $1^{st}$ symbol of the reserved resource is $\{2, 4, 8, 10, 16, 18, 22, 24\}$.

In some embodiments of this application, when the frequency range applicable to the first resource pattern is less than or equal to the first frequency value, the first position is $\{2, 8\}+14n$, where n=0, and $\{2, 8\}$ indicates that a value is 2 or 8; or when the frequency range is greater than the first frequency value, the first position is $\{2, 8\}+14n$, where n=0 or 1, and $\{2, 8\}$ indicates that a value is 2 or 8.

For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

For example, a quantity of first time units included in each of eight resource sets is 4. For example, the first resource pattern falls within the case B, and in one time unit, for example, 5 ms, five subframes, or one half frame, there are one or more time domain positions of the reserved resource. Each reserved resource includes M symbols in time domain, for example, M=4, and a number of the $1^{st}$ start symbol of the reserved resource is $\{2, 8\}+14n$. If the frequency range is less than or equal to 3 GHz, n=0, or if the frequency range is greater than 3 GHz and less than 6 GHz, n=0 or 1. The symbol number is a symbol number in the time unit.

In some embodiments of this application, the first position is $\{2, 16\}$, where $\{2, 16\}$ indicates that a value is 2 or 16.

The value of the first position is fixed to 2 or 16, thereby resolving a problem that the first position cannot be accurately indicated when time domain symbol lengths are different due to different subcarrier spacings. Each reserved resource includes M symbols in time domain, for example, M=10, and a number of the $1^{st}$ symbol of the reserved resource is $\{2, 16\}$. The symbol number is a symbol number in the time unit.

In some embodiments of this application, when the frequency range applicable to the first resource pattern is less than or equal to the first frequency value, the second position is $\{1, 4\}+7n$, where n=0 or 1, and $\{1, 4\}$ indicates that a value is 1 or 4; or when the frequency range is greater than the first frequency value, the second position is $\{1, 4\}+7n$, where n=0, 1, 2, or 3, and 11, 41 indicates that a value is 1 or 4.

For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

For example, a quantity of first time units included in each of eight resource sets is 2. For example, the first resource pattern falls within the case C, and in one time unit, for example, 5 ms, five subframes, or one half frame, there are one or more time domain positions of the reserved resource. Each reserved resource includes M symbols in time domain, for example, M=2, and a number of the $1^{st}$ start symbol of the reserved resource is $\{1, 4\}+7n$. If the frequency range is less than or equal to 3 GHz, and n=0 or 1, a number of the $1^{st}$ symbol of the reserved resource is $\{1, 4, 8, 11\}$. Alternatively, if the frequency range is greater than 3 GHz and less than 6 GHz, and n=0, 1, 2, or 3, a number of the $1^{st}$ symbol of the reserved resource is $\{1, 4, 8, 11, 15, 18, 22, 25\}$. The symbol number is a symbol number in the time unit.

In some embodiments of this application, when the frequency range applicable to the first resource pattern is less than or equal to the first frequency value, the third position is $\{2, 8\}+14n$, where n=0 or 1, and $\{2, 8\}$ indicates that a value is 2 or 8; or when the frequency range is greater than the first frequency value, the third position is $\{2, 8\}+14n$, where n=0, 1, 2, or 3, and $\{2, 8\}$ indicates that a value is 2 or 8.

For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

For example, a quantity of first time units included in each of eight resource sets is 4. For example, the first resource pattern falls within the case A, and in one time unit, for example, 5 ms, five subframes, or one half frame, there are one or more time domain positions of the reserved resource. Each reserved resource includes M symbols in time domain, for example, M=4, and a number of the $1^{st}$ start symbol of the reserved resource is {2, 8}+14n. If the frequency range is greater than 3 GHz and less than 6 GHz, and n=0, 1, 2, or 3, numbers of the $1^{st}$ symbols of eight reserved resources are {2, 8, 16, 22, 30, 36, 44, 50}. Alternatively, if the frequency range is less than or equal to 3 GHz, and n=0 or 1, numbers of the $1^{st}$ symbols of four reserved resources are {2, 8, 16, 22}. The number is a number of the symbol in the time unit.

In some embodiments of this application, when the frequency range applicable to the first resource pattern is less than or equal to the first frequency value, the third position is {2, 16}+28n, where n=0, and {2, 16} indicates that a value is 2 or 16; or when the frequency range is greater than the first frequency value, the third position is {2, 16}+28n, where n=0 or 1, and {2, 16} indicates that a value is 2 or 16.

For whether the frequency range applicable to the first resource pattern is less than or equal to the first frequency value, there are two cases of a value of n. In a case of different values of n, the value of the first position may be determined separately, and different values of the first position indicate different first resource patterns. In this embodiment of this application, different resource patterns may be indicated, and a quantity of resource patterns is far less than a quantity of time domain symbols. Therefore, signaling overheads can be greatly reduced.

For example, a quantity of first time units included in each of eight resource sets is 10. For example, the first resource pattern falls within the case A, and in one time unit, for example, 5 ms, five subframes, or one half frame, there are one or more time domain positions of the reserved resource. Each reserved resource includes M symbols in time domain, for example, M=10, and a number of the $1^{st}$ start symbol of the reserved resource is {2, 16}+28n. When a frequency is less than 3 GHz, n=0. When the frequency range is greater than 3 GHz and less than or equal to 6 GHz, n=0 or 1.

An embodiment of this application further provides another resource indication method, mainly including the following procedure:

A second communication device determines a reserved resource, where the reserved resource is a resource indicated by the second communication device to the first communication device and unavailable to the first communication device, a resource that needs to be punctured (puncture) or dropped (drop), or a resource that needs to be rate-matched.

The second communication device determines first information, where the first information is used to indicate a first resource pattern and indicate the reserved resource determined by using the first resource pattern, the first resource pattern is used to determine a position corresponding to each of N resource sets, and N is a positive integer greater than or equal to 1.

The second communication device sends the first information to the first communication device.

The first communication device receives the first information sent by second communication device, where the first information is used to indicate the first resource pattern and indicate the reserved resource determined by using the first resource pattern, the first resource pattern is used to determine the position corresponding to each of the N resource sets, and N is a positive integer greater than or equal to 1.

The first communication device determines the reserved resource based on the positions corresponding to the N resource sets and indicated by the first resource pattern, where the reserved resource is a resource unavailable to the first communication device.

The first communication device determines not to transmit a signal by using the reserved resource.

The first information includes fifth indication information, and the fifth indication information is used to indicate a quantity of subcarriers of the first resource; and/or indicate that a subcarrier carrying the first resource is located at the largest end or the smallest end of a subcarrier sequence.

The fifth indication information sent by the second communication device is used to indicate that a subcarrier that needs to be punctured is located at a small end or a large end of a subcarrier number, or indicate that a subcarrier that needs to be dropped is located at a small end or a large end of a subcarrier number, or indicate that a subcarrier that needs to be rate-matched is located at a small end or a large end of a subcarrier number. For another example, the fifth indication information sent by the second communication device is used to indicate that a subcarrier that needs to be punctured is located at a small end or a large end of a resource block (RB) number, or indicate that a subcarrier that needs to be dropped is located at a small end or a large end of a resource block (RB) number, or indicate that a subcarrier that needs to be rate-matched is located at a small end or large end of a resource block (RB) number. The above small end refers to a side with a smaller number when numbers are sorted in ascending order. For example, the small end may be the smallest end, that is, the number is the smallest. The above large end refers to a side with a larger number when numbers are sorted in descending order. For example, the large end may be the largest end, that is, the number is the largest.

In this embodiment of this application, the fifth indication information may further indicate a quantity of subcarriers that need to be punctured (puncture), dropped (drop), or rate-matched. For example, if a value of the fifth indication information is 0, it indicates that the reserved resource is on a side with a smaller subcarrier number. If a value of the fifth indication information is 1, it indicates that the reserved resource is on a side with a larger subcarrier number. For example, 1-bit information indicates whether a subcarrier that needs to be punctured, dropped, or rate-matched is located at the largest end, a large end, or the smallest end of a subcarrier number or an RB number. For example, 2 bits are used. 00 indicates that a subcarrier that needs to be punctured, dropped, or rate-matched is located at an end with a smaller number, and the quantity of subcarriers is 1. 01 indicates that a subcarrier that needs to be punctured, dropped, or rate-matched is located at an end with a smaller (smallest) number, and the quantity of subcarriers is 2. 10 indicates that a subcarrier that needs to be punctured, dropped, or rate-matched is located at an end with a larger (largest) number, and the quantity of subcarriers is 1. 11 indicates that the subcarrier that needs to be punctured, dropped, or rate-matched is located at an end with a larger (largest) number, and the quantity of subcarriers is 2.

It may be understood that, in this embodiment of this application, the second communication device sends the fifth indication information to the first communication device, and the first communication device determines, based on the fifth indication information, that N subcarriers with the smallest subcarrier numbers need to be punctured, dropped, or rate-matched. Alternatively, N subcarriers with the largest subcarrier numbers need to be punctured, dropped, or rate-matched. That is, the fifth indication information indicates two pieces of content. One is a position of the subcarrier that needs to be punctured, dropped, or rate-matched, and the other is the quantity of subcarriers that needs to be punctured, dropped, or rate-matched.

In addition, the largest end and the smallest end may also be understood that the subcarriers that need to be punctured, dropped, or rate-matched are numbered 0, 1, ..., and N−1, or M−1, M−2, ..., and M−N. N is the quantity of subcarriers that needs to be punctured, dropped, or rate-matched, and M is a quantity of subcarriers included in a system bandwidth or a quantity of subcarriers included in a narrowband.

212. The first communication device determines the reserved resource based on the positions corresponding to the N resource sets and indicated by the first resource pattern, where the reserved resource is a resource unavailable to the first communication device.

In some embodiments of this application, after the first communication device receives the first information, the first communication device may parse the first information, determine the first resource pattern indicated by the first information, and determine the positions corresponding to the N resource sets indicated by the first resource pattern. The reserved resource that is configured by the second communication device is determined by using the positions corresponding to the N resource sets indicated by the first resource pattern, and the first communication device cannot use the reserved resource. For an indication manner of the first information, refer to detailed descriptions of the first information in the foregoing content.

213. The first communication device determines not to transmit a signal by using the reserved resource.

In this embodiment of this application, after the first communication device determines the reserved resource indicated by the second communication device, the first communication device may determine that a signal cannot be transmitted by using the reserved resource, where the signal includes one or more of the following signals: a physical uplink channel, a physical downlink channel, a reference signal, a physical uplink control channel, a physical downlink control channel, a cell-specific reference signal, a sounding (sounding) reference signal, and a demodulation reference signal.

It should be noted that, in some other embodiments of this application, if the first communication device determines an available resource, the first communication device may use the available resource to transmit a signal, where the signal includes one or more of the following signals: a physical uplink channel, a physical downlink channel, a reference signal, a physical uplink control channel, a physical downlink control channel, a cell-specific reference signal, a sounding reference signal, and a demodulation reference signal.

In some embodiments of this application, the first information is further used to indicate that the reserved resource is used for a synchronization signal block or a control resource set. That is, a reservation manner (or type) of the reserved resource may be used for the synchronization signal block, or used for the control resource set.

In some embodiments of this application, when the first information indicates a third state, the first resource pattern indicates a first resource reservation type and indicates a first position corresponding to the N resource sets;

when the first information indicates a fourth state, the first resource pattern indicates a first resource reservation type and indicates a second position corresponding to the N resource sets;

when the first information indicates a fifth state, the first resource pattern indicates a second resource reservation type; and when the first information indicates a sixth state, the first resource pattern indicates that the reserved resource does not exist in the N resource sets.

The first resource reservation type may be used for the synchronization signal block, and the second resource reservation type may be used for the control resource set. For example, when the first resource pattern indicates the first position corresponding to the N resource sets, the first resource pattern may fall within the foregoing case B. When the first resource pattern indicates the second position corresponding to the N resource sets, the first resource pattern may fall within the foregoing case C.

In some embodiments of this application, when the first information indicates a third state, the first resource pattern indicates a first resource reservation type and indicates a first position corresponding to the N resource sets;

when the first information indicates a fourth state, the first resource pattern indicates a first resource reservation type and indicates a second position corresponding to the N resource sets;

when the first information indicates a fifth state, the first resource pattern indicates a second resource reservation type; and when the first information indicates a sixth state, the first resource pattern indicates a first resource reservation type and indicates a third position corresponding to the N resource sets.

The first resource reservation type may be used for the synchronization signal block, and the second resource reservation type may be used for the control resource set. For example, when the first resource pattern indicates the first position corresponding to the N resource sets, the first resource pattern may fall within the foregoing case B. When the first resource pattern indicates the second position corresponding to the N resource sets, the first resource pattern may fall within the foregoing case C. When the first resource pattern indicates the third position corresponding to the N resource sets, the first resource pattern may fall within the foregoing case A.

It can be learned from the examples in the foregoing embodiment that, in this embodiment of this application, after the second communication device determines the reserved resource, the second communication device may obtain the first information, and use the first information to indicate the first resource pattern, and may further use the first information to indicate the reserved resource determined by using the first resource pattern. The second communication device sends the first information to the first communication device, so that the first communication device can determine the first resource pattern and indicate the reserved resource determined by using the first resource pattern. Finally, the first communication device may transmit a signal without using the reserved resource. In this embodiment of this application, the first information sent by the second communication device indicates the first resource pattern, and the reserved resource is further determined by using the positions corresponding to the N resource sets indicated by the first resource pattern. In this embodiment of this application, the resource pattern is indicated, so that a waste of resources can be reduced, and signaling overheads during resource indication are reduced.

To better understand and implement the foregoing solutions in the embodiments of this application, the following uses corresponding application scenarios as examples for specific description.

In the embodiments of this application, a reserved resource may be indicated in an LTE system for an SSB and a coreset in an NR system, to achieve an optimal compromise between signaling overheads and resource indication flexibility. In the embodiments of this application, a bitmap may be used to indicate whether there is an SSB at a plurality of candidate SSB positions, indicate a subcarrier spacing used by the NR system, and indicate whether a resource pattern of the SSB falls within a case B or a case C when the subcarrier spacing is 30 kHz. In addition, in the embodiments of this application, resource patterns of the reserved resource in time domain are indicated in different cases. In the embodiments of this application, a network device may also indicate whether the reserved resource is used for the SSB or the coreset. In the embodiments of this application, a quantity of symbols that need to be reserved and a start position and a period in one subframe are indicated for the coreset.

In this embodiment of this application, a first device may be a network device, and a second device may be a terminal device. Alternatively, a second device may be a network device, and a first device may be a terminal device. Alternatively, a first device may be a device having a sending capability, and a second device may be a device having a receiving capability. In the following embodiments, an example in which the first device is the network device and the second device is the terminal device is used for description. In the embodiments of this application, an interaction procedure between the network device and the terminal device mainly includes the following steps.

Step 1: The network device determines first information and/or second information.

Step 2: The network device sends the first information and/or the second information to the terminal device.

The first information and the second information are used to indicate a reserved resource, or used to indicate an available resource, or used to indicate an unavailable resource, or used to indicate a resource that needs to be rate-matched.

Specifically, the first information includes one or more of the following information: first-type indication information, period information, second-type indication information, a first offset value, and subcarrier spacing information.

The first-type indication information is used to indicate whether the reserved resource exists, whether L (L=4 or 8) reserved resource units need to be reserved, or whether L reserved resource units in an SSB pattern indicated by the second-type indication information need to be reserved.

The period information is used to indicate a period applicable to the reserved resource pattern. Optionally, the period may include two pieces of period information (an SSB and a coreset), which are respectively applicable to different resource reservation cases.

The second-type indication information is used to indicate an SSB or a pattern (pattern) of the reserved resource, or indicate that the reserved resource falls within one or more of the following cases: a first case (for example, the case B for SSBs), a second case (for example, the case C for SSBs), or a third case (for example, a case A for SSBs), or no reservation is required.

Optionally, as shown in the following Table 1, the subcarrier spacing information indicates that a subcarrier spacing is 15 kHz or 30 kHz. For example, the indication information is 1 bit, and a first state (for example, 0) indicates that the subcarrier spacing is 15 kHz or indicates that a multiple of the subcarrier spacing is 1. A second state (for example, 1) indicates that the subcarrier spacing is 30 kHz or indicates that the multiple of the subcarrier spacing is 2. Optionally, the subcarrier spacing is a subcarrier spacing in the NR system.

TABLE 1 is an example of the subcarrier spacing information.

| Subcarrier spacing information | Indication content |
| --- | --- |
| First state (for example, 0) | First subcarrier spacing (for example, 15 kHz) |
| Second state (for example, 1) | Second subcarrier spacing (for example, 30 kHz) |

Optionally, a quantity of bits of the second-type indication information is M, and M is an integer greater than or equal to 0.

As shown in the following Table 2, for example, M=1, the first state (for example, 0) indicates that the reserved resource falls within the first case (for example, the case B), and the second state (for example, 1) indicates that the reserved resource falls within the second case (for example, the case C). Optionally, when the subcarrier spacing information indicates a second subcarrier spacing or indicates that the subcarrier spacing is 30 kHz or indicates that a subcarrier spacing of a second system is 30 kHz, M=1; otherwise, M=0.

TABLE 2 is an example of the second-type indiction information.

| Second-type indication information | Indication content |
| --- | --- |
| First state (for example, 0) | First case for the reserved resource (for example, the case B or the case B for SSBs) |
| Second state (for example, 1) | Second case for the reserved resource (for example, the case C or the case C for SSBs) |

For example, M=2. The first state (for example, 00) is used to indicate that no reservation is required. The second state (for example, 01) is used to indicate a reservation case 1 (for example, the case A or the case A for SSBs). A third state (for example, 10) is used to indicate a reservation case 2 (for example, the case B or the case B for SSBs). A fourth state (for example, 11) is used to indicate a reservation case 3 (for example, the case C or the case C for SSBs). Optionally, the first state (for example, 00) is used to indicate the reservation case 1 (for example, the case A or the case A for SSBs). The second state (for example, 01) is used to indicate the reservation case 2 (for example, the case B or the case B for SSBs). The third state (for example, 10) is used to indicate the reservation case 3 (for example, the case C or the case C for SSBs).

Figure 3:
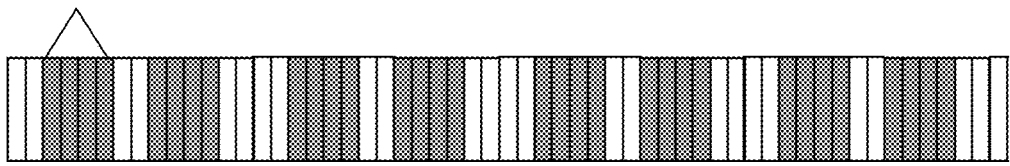
FIG. 3 is a schematic diagram of a position of the $1^{st}$ start symbol of a reserved resource according to an embodiment of this application.

Optionally, the resource reservation case 1, the case A, or the case A for SSBs is that at one or more time domain positions of candidate reserved resources in a time unit, for example, 5 ms, five subframes, or one half frame, each reserved resource includes M symbols in time domain, for example, M=4, and a number of the $1^{st}$ start symbol of the candidate reserved resource is {2, 8}+14n, where n=0, 1, 2, or 3, that is, numbers of the $1^{st}$ symbols of eight reserved resources are {2, 8, 16, 22, 30, 36, 44, 50}, or n=0 or 1, that is, numbers of the $1^{st}$ symbols of four reserved resources are {2, 8, 16, 22}. The number is a number of the symbol in the time unit. FIG. 3 a schematic diagram of a position of the $1^{st}$ start symbol of a reserved resource according to an embodiment of this application. Shaded grids represent reserved resources when n={0, 1, 2, 3}, and each small grid represents a symbol. The terminal device may determine a frequency range based on an operating bandwidth of the terminal device. Optionally, when the frequency range is less than or equal to 3 GHz, n=0 or 1. When the frequency range is greater than 3 GHz and less than or equal to 6 GHz, n=0, 1, 2, or 3.

Figure 4:
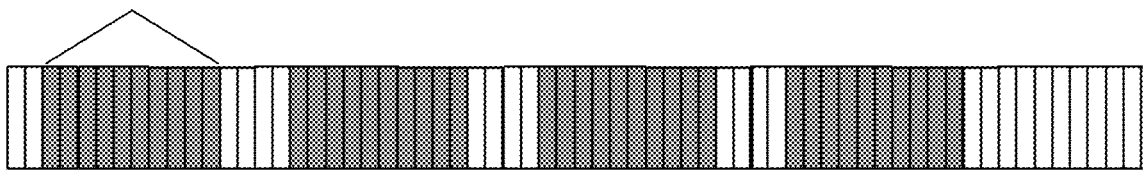
FIG. 4 is a schematic diagram of another position of the $1^{st}$ start symbol of a reserved resource according to an embodiment of this application.

FIG. 4 is a schematic diagram of another position of the $1^{st}$ start symbol of a reserved resource according to an embodiment of this application. Optionally, in the resource reservation case 1, M=10, and a number of the $1^{st}$ start symbol of the reserved resource is {2, 16}+28n. When a frequency is less than 3 GHz, n=0. When the frequency range is greater than 3 GHz and less than or equal to 6 GHz, n=0 or 1.

Figure 5:
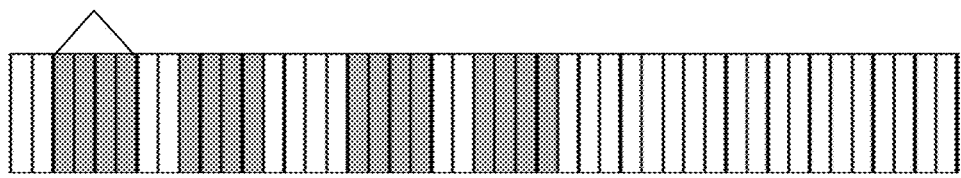
FIG. 5 is a schematic diagram of another position of the $1^{st}$ start symbol of a reserved resource according to an embodiment of this application.

Optionally, the resource reservation case 2, the case B, or the case B for SSBs is that at one or more time domain positions of candidate reserved resources in a time unit, for example, 5 ms, five subframes, or one half frame, each reserved resource includes M symbols in time domain, for example, M=2, and a number of the $1^{st}$ start symbol of the reserved resource is {2, 4, 8, 10}+14n, where n=0, that is, a number of the $1^{st}$ symbol of the reserved resource is {2, 4, 8, 10}, or n=0 or 1, that is, a number of the $1^{st}$ symbol of the reserved resource is {2, 4, 8, 10, 16, 18, 22, 24}. The symbol number is a symbol number in the time unit. FIG. 5 is a schematic diagram of another position of the $1^{st}$ start symbol of a reserved resource according to an embodiment of this application. Shaded grids represent reserved resources when n={0, 1}, and each small grid represents a symbol. Optionally, when the frequency range is less than or equal to 3 GHz, n=0. When the frequency range is greater than 3 GHz and less than or equal to 6 GHz, n=0 or 1.

Figure 6:
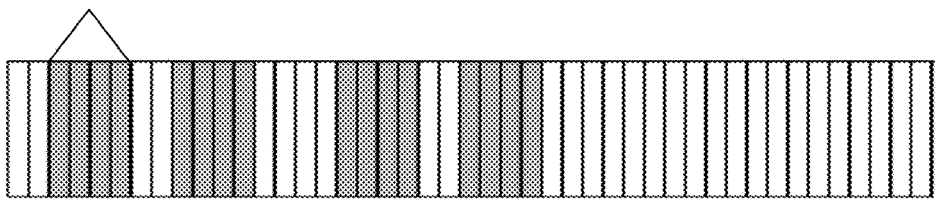
FIG. 6 is a schematic diagram of another position of the $1^{st}$ start symbol of a reserved resource according to an embodiment of this application.

FIG. 6 is a schematic diagram of another position of the $1^{st}$ start symbol of a reserved resource according to an embodiment of this application. Optionally, in the resource reservation case 2, M=4, and a number of the $1^{st}$ start symbol of the reserved resource is {2, 8}+14n, where n=0, or n=0 or 1. The symbol number is a symbol number in the time unit.

Figure 7:
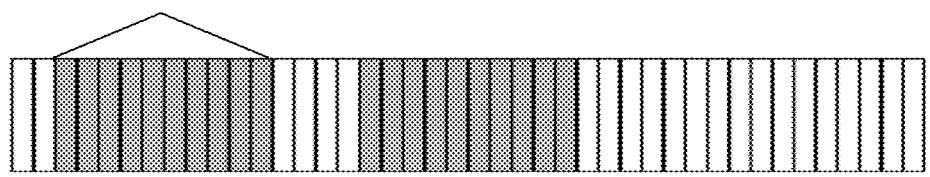
FIG. 7 is a schematic diagram of another position of the $1^{st}$ start symbol of a reserved resource according to an embodiment of this application.

FIG. 7 is a schematic diagram of another position of the $1^{st}$ start symbol of a reserved resource according to an embodiment of this application. Optionally, in the resource reservation case 2, M=10, and the $1^{st}$ symbol number of the reserved resource is {2, 16}. The symbol number is a symbol number in the time unit.

Figure 8:
FIG. 8 is a schematic diagram of another position of the $1^{st}$ start symbol of a reserved resource according to an embodiment of this application.

Optionally, the resource reservation case 3, the case C, or the case C for SSBs is that at one or more time domain positions of (candidate) reserved resources in a time unit, for example, 5 ms, five subframes, or one half frame, each reserved resource includes M symbols in time domain, for example, M=2, and a number of the $1^{st}$ start symbol of the reserved resource is {1, 4}+7n, where n=0 or 1, that is, a number of the $1^{st}$ symbol of the reserved resource is {1, 4, 8, 11}, or n=0, 1, 2, or 3, that is, a number of the $1^{st}$ symbol of the reserved resource is {1, 4, 8, 11, 15, 18, 22, 25}. The symbol number is a symbol number in the time unit. FIG. 8 is a schematic diagram of another position of the $1^{st}$ start symbol of a reserved resource according to an embodiment of this application. Shaded grids represent reserved resources when n={0, 1, 2, 3}, and each small grid represents a symbol. Optionally, when the frequency range is less than or equal to 3 GHz, n=0 or 1. When the frequency range is greater than 3 GHz and less than or equal to 6 GHz, n=0, 1, 2, or 3.

Optionally, a quantity of bits of the first-type indication information is P, and P is an integer greater than or equal to 1, especially, for example, P=8, P=4, or P=2. For example, P=8. When the frequency range is greater than 3 GHz and less than or equal to 6 GHz, 8 bits indicate one or more of the foregoing resource reservation cases 1 to 3. For example, if a bit is 1, it indicates that a reserved resource at a corresponding position needs to be reserved or is unavailable. If the bit is 0, the reserved resource at the corresponding position does not need to be reserved or is available. When the frequency range is less than or equal to 3 GHz, the first 4 bits in the 8 bits are used to indicate a reservation case of the reserved resource at the corresponding position, or in this case, P=4.

Figure 9:
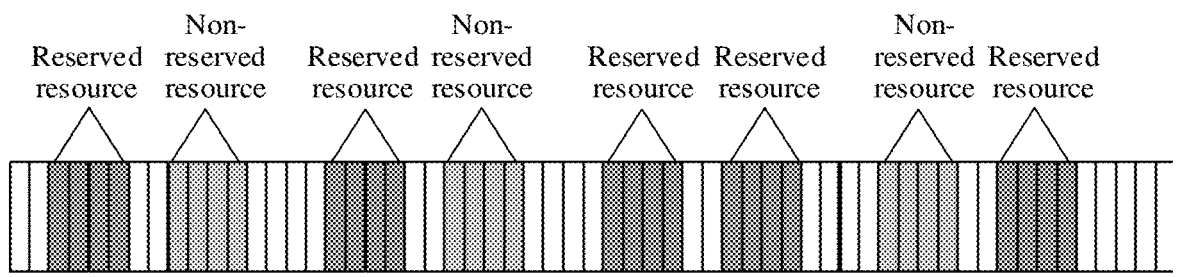
FIG. 9 is a schematic diagram of another position of the $1^{st}$ start symbol of a reserved resource according to an embodiment of this application.

For example, for the case A, eight reserved resources with the $1^{st}$ symbols numbered {2, 8, 16, 22, 30, 36, 44, 50} are in a one-to-one correspondence with eight bitmaps. The bit 1 indicates that the reserved resource at the corresponding position needs to be reserved or is unavailable, and the bit 0 indicates that the reserved resource at the corresponding position does not need to be reserved or is available. FIG. 9 is a schematic diagram of another position of the $1^{st}$ start symbol of a reserved resource according to an embodiment of this application. For example, when the first-type indication information is 10101101, 1 indicates a reserved resource, and 0 indicates a non-reserved resource.

Figure 10:
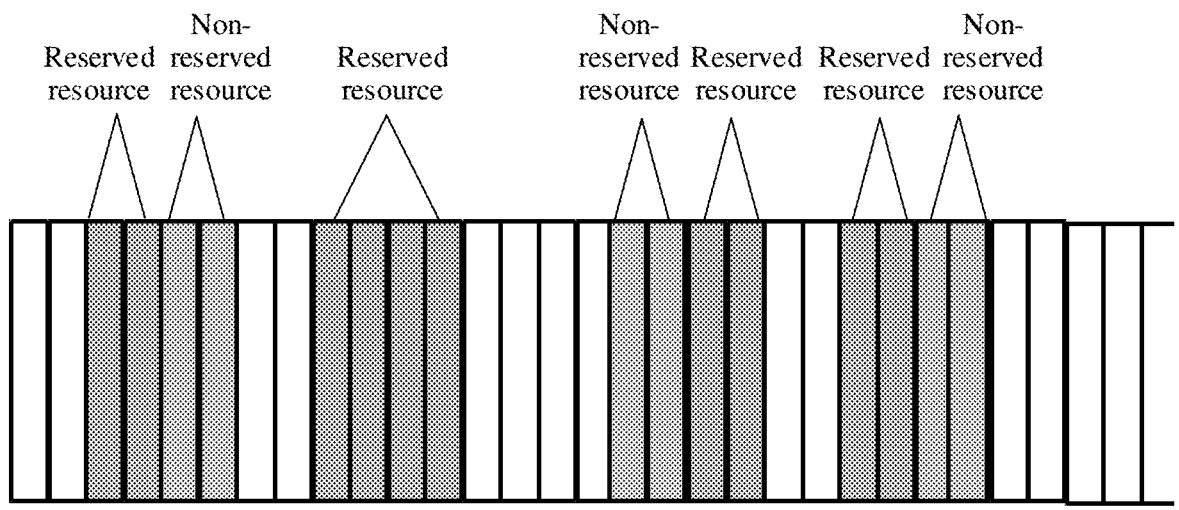
FIG. 10 is a schematic diagram of another position of the $1^{st}$ start symbol of a reserved resource according to an embodiment of this application.

For the case B, eight reserved resources with the $1^{st}$ symbols numbered {2, 4, 8, 10, 16, 18, 22, 24} are in a one-to-one correspondence with eight bitmaps. The bit 1 indicates that the reserved resource at the corresponding position needs to be reserved or is unavailable, and the bit 0 indicates that the reserved resource at the corresponding position does not need to be reserved or is available. FIG. 10 is a schematic diagram of another position of the $1^{st}$ start symbol of a reserved resource according to an embodiment of this application. For example, when first-type indication information is 10110110, 1 indicates a reserved resource, and 0 indicates a non-reserved resource.

Optionally, a quantity of bits of the first-type indication information is P. When the frequency range is less than or equal to 3 GHz, P=4. When the frequency range is greater than 3 GHz and less than or equal to 6 GHz, P=8. Alternatively, the first-type indication information is a long bitmap or a short bitmap, and a quantity of bits of the long bitmap is greater than that of the short bitmap. For example, a length of the long bitmap is 8, and a length of the short bitmap is 4.

Optionally, a first offset value indicates an offset value of the $1^{st}$ symbol number of the reserved resource. The first offset value indicates the offset value of the $1^{st}$ symbol number of the reserved resource based on a first unit, and the first unit includes a symbol, a subframe, a slot, a frame, and the like. For example, if the offset value indicated by the first offset value is x symbols, the $1^{st}$ symbol number of the reserved resource is:

in the resource reservation case 1: mod({2, 8}+14n+x, 70), where n=0, 1, 2, or 3, or n=0 or 1, mod(a, b) is a modulo operation, and a result is a remainder of a divided by b;

in the resource reservation case 2: mod({2, 4, 8, 10}+14n+x, 70), where n=0, or n=0 or 1; and in the resource reservation case 3: mod({1, 4}+7n+x, 70), where n=0 or 1, or n=0, 1, 2, or 3.

It should be noted that a symbol numbered 0 is the $1^{st}$ symbol of the 1st subframe or the $1^{st}$ slot in a half frame.

Optionally, in the foregoing reserved resource, a result of a cyclic shift of the number of the $1^{st}$ symbol of the reserved resource may also be used to calculate the position of the reserved resource, for example, in the resource reservation case 1: mod({2, 8}+14n+x, 70), where n=0, 1, 2, or 3, or n=0 or 1, mod(a, b) is a modulo operation, and a result is a remainder of a divided by b;

in the resource reservation case 2: mod({2, 4, 8, 10}+14n+x, 70), where n=0, or n=0 or 1; and in the resource reservation case 3: mod({1, 4}+7n+x, 70), where n=0 or 1, or n=0, 1, 2, or 3.

x is an integer greater than or equal to 0. It should be noted that the foregoing formula is merely a description manner. Other expression manners may be used, for example, a table or a mapping relationship curve, provided that obtained results are the same.

Optionally, a base station further sends fourth-type indication information, where the fourth-type indication information is used to indicate a quantity Q of symbols occupied by the reserved resource, and Q is an integer greater than or equal to 1, for example, Q=1, 2, or 3.

Optionally, the base station further sends fifth-type indication information, where the fifth-type indication information indicates a start position of the $1^{st}$ symbol of the reserved resource by using a bitmap. For example, 14 bits are used to indicate a position number of the $1^{st}$ symbol of the reserved resource in a subframe (a quantity of symbols in a subframe is 14). For example, the fourth-type indication information indicates that the reserved resource occupies three symbols, and the fifth-type indication information is 10010010000000, and indicates that the subframe includes three reserved resources, positions of the $1^{st}$ symbols are symbols numbered 0, 3, and 6, and a length of each reserved resource is three symbols.

Optionally, the second information is used to indicate whether the resource is a reserved resource or an available resource.

Figure 11:
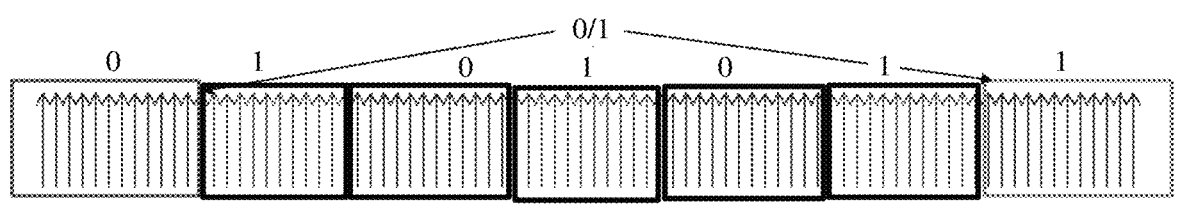
FIG. 11 is a schematic diagram of indicating a subcarrier number according to an embodiment of this application.

Optionally, FIG. 11 is a schematic diagram of indicating a subcarrier number according to an embodiment of this application. The base station further sends sixth-type indication information, used to indicate whether a subcarrier that needs to be punctured (puncture), dropped (drop), or rate-matched is located at the largest end or a large end of a subcarrier number or an RB number or at the smallest end of the number, and/or indicate a quantity of subcarriers that needs to be punctured (puncture), dropped (drop), or rate-matched. For example, 0 indicates that the reserved resource is on a side with a smaller subcarrier number, and 1 indicates that the reserved resource is on a side with a larger subcarrier number.

Step 3: The terminal device receives the first information and/or the second information sent by the network device.

Step 4: The terminal device determines the first information and/or the second information, and reserves a corresponding resource or receives and sends information by using a corresponding resource based on the first information and/or the second information. For a specific solution, refer to the descriptions of step 2.

According to the solution in the embodiments of this application, a resource conflict with the SSB and the coreset can be effectively avoided. In addition, compared with a time-domain bitmap, the reserved resource types of the SSB and the coreset are indicated based on characteristics of the SSB and the coreset, signaling overheads can be reduced, and a granularity of the reserved resource is a symbol, which avoids a waste of resources.

A valid subframe or an invalid subframe is indicated by using a bitmap in an LTE-A system (a quantity of symbols included in a subframe is 14). In the embodiments of this application, the resource pattern indicating the SSB or the coreset is symbol-level resource reservation.

Compared with the time-frequency domain bitmap in the NR system, resource pattern design signaling of the SSB and the coreset is combined in the embodiments of this application to indicate different resource patterns, and a quantity of resource patterns is far less than a quantity of time domain symbols, thereby greatly reducing signaling overheads.

In the embodiments of this application, the bitmap is used to indicate whether there is an SSB at eight candidate SSB positions, indicate the subcarrier spacing used by the NR system, and indicate whether a resource pattern of the SSB falls within the case B or the case C when the subcarrier spacing is 30 kHz. In the embodiments of this application, symbol-level resource reservation is performed, thereby further saving resources.

In the embodiments of this application, when different scenarios are indicated or defined, different resource patterns of the resource are used. Because SCSs in NR and LTE may be different, and frame boundaries may be misaligned, a position of the reserved resource of the SSB may be determined by indicating or defining different resource patterns. The position of the reserved resource is precisely defined and indicated, thereby avoiding a collision problem between LTE and the NR.

In the embodiments of this application, the network device may indicate whether the reserved resource is used for the SSB or the corset, to distinguish between different indication signaling, thereby avoiding confusion and a waste of signaling.

In the embodiments of this application, a quantity of symbols that need to be reserved and a start position and a period in one subframe are indicated for the coreset. In the embodiments of this application, symbol-level resource reservation is used to save resources.

Figure 12:
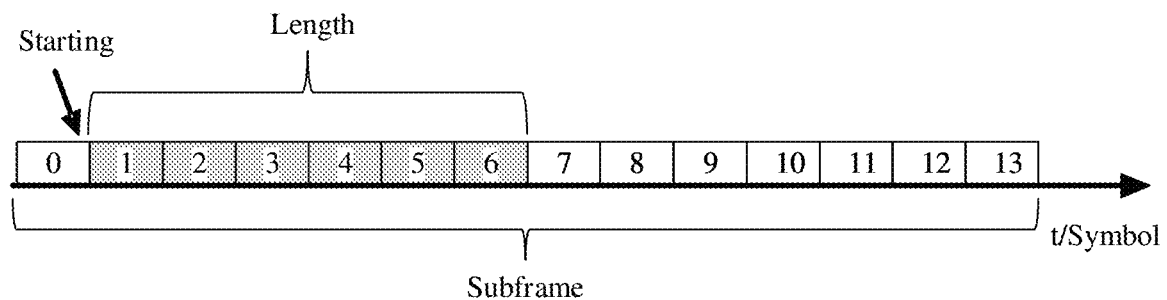
FIG. 12 is a schematic diagram of indicating a start position and a time length according to an embodiment of this application.

In some embodiments of this application, FIG. 12 is a schematic diagram of indicating a start position and a time length according to an embodiment of this application. The first information includes a first indication value, and the first indication value is used to indicate a start position of a first resource and a quantity of time units included in the first time unit.

The first indication value Q and a quantity Q of time units included in the first time unit meet the following relationship:

when $(L-1)<\text{floor}(N/2), Q=N(L-1)+T\text{start}$; or when $(L-1)\geq\text{floor}(N/2), Q=N(N-L+1)+(N-1-T\text{start})$.

L is a length of the first resource, Tstart is the start position of the first resource in the first time unit, and floor represents rounding down.

The first information includes the first indication value, and the first indication value indicates the start position and a second time length of the resource that needs to be reserved in the first time unit. The start position may be a start position of a symbol/slot, and the second time length may be a quantity of symbols/slots. The first time unit may be one subframe, one frame, or N frames (N is an integer greater than or equal to 0). Optionally, the first indication value is used to indicate a start point in time domain and a length of continuous time-domain time. If the first time unit (for example, a subframe) includes N second time units (for example, symbols, where N=14), the first indication value Q meets the foregoing relationship.

Figure 13:
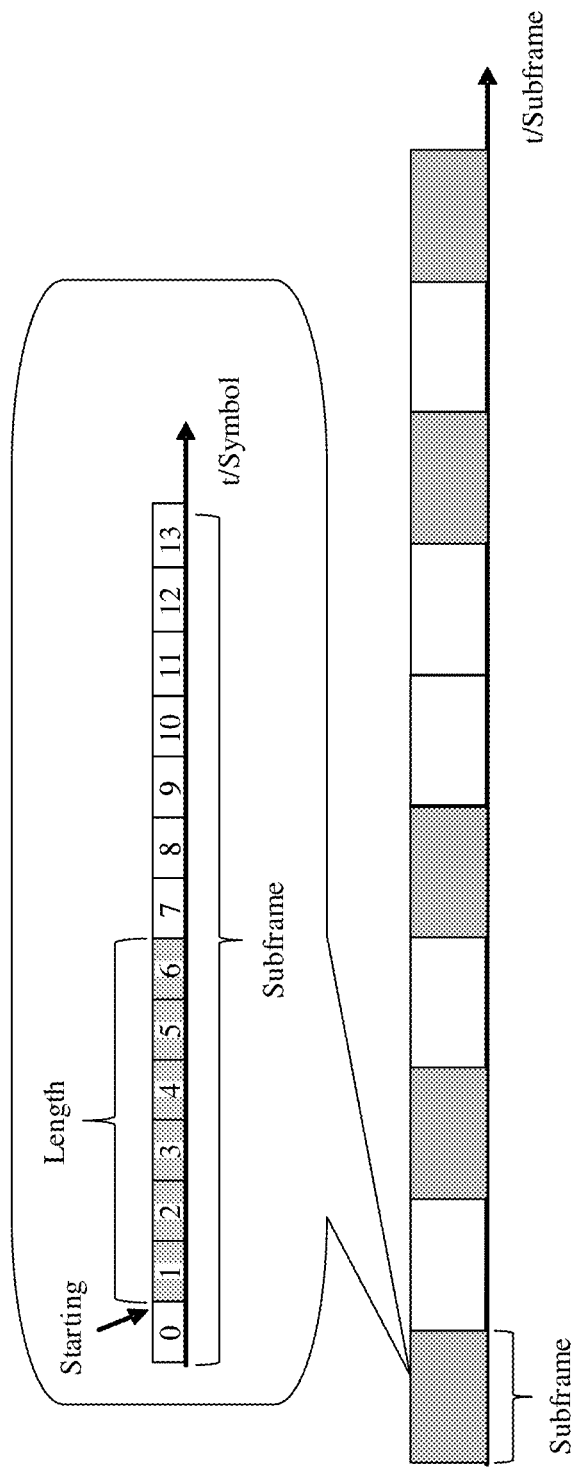
FIG. 13 is another schematic diagram of indicating a start position and a time length according to an embodiment of this application.

Optionally, the first information further includes second indication information, and the second indication information is used to indicate a pattern of the reserved resource determined by using the first indication value in time domain, or indicate a time-domain resource pattern in a unit of the first time unit. FIG. 13 is another schematic diagram of indicating a start position and a time length according to an embodiment of this application. For example, a bitmap corresponding to the resource pattern is 1010100101. For example, the bitmap may be used for indication. 1 indicates that a resource in the first time unit is reserved in time domain based on a resource reservation manner indicated by the first indication information, and 0 indicates that no reservation is required in time domain.

It should be noted that, for brief description, the foregoing method embodiments are described as a series of action combinations. However, a person skilled in the art should understand that this application is not limited to the described action sequence, because according to this application, some steps may be performed in other sequences or simultaneously. In addition, it should be further appreciated by a person skilled in the art that the embodiments described in this specification are all example embodiments, and the involved actions and modules are not necessarily required by this application.

To better implement the foregoing solutions in the embodiments of this application, the following further provides a related apparatus for implementing the foregoing solutions.

Figure 14:
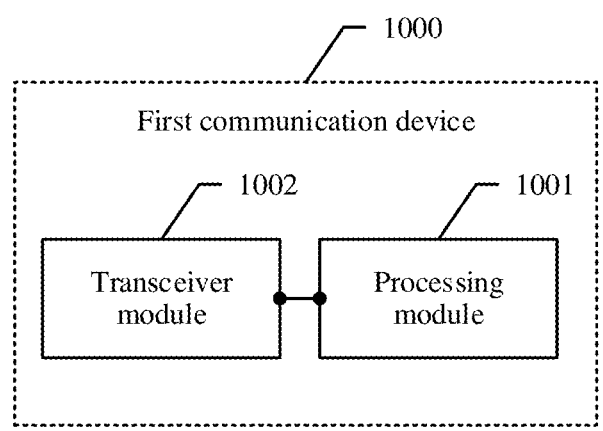
FIG. 14 is a schematic diagram of a composition structure of a first communication device according to an embodiment of this application.

FIG. 14 is a schematic diagram of a composition structure of a first communication device according to an embodiment of this application. The first communication device 1000 includes a processing module 1001 and a transceiver module 1002.

The transceiver module is configured to receive first information sent by a second communication device, where the first information is used to indicate a first resource pattern and indicate a reserved resource determined by using the first resource pattern, the first resource pattern is used to determine a position corresponding to each of N resource sets, and N is a positive integer greater than or equal to 1.

The processing module is configured to determine the reserved resource based on the positions corresponding to the N resource sets and indicated by the first resource pattern, where the reserved resource is a resource unavailable to the first communication device.

The processing module is configured to determine not to transmit a signal by using the reserved resource.

Figure 15:
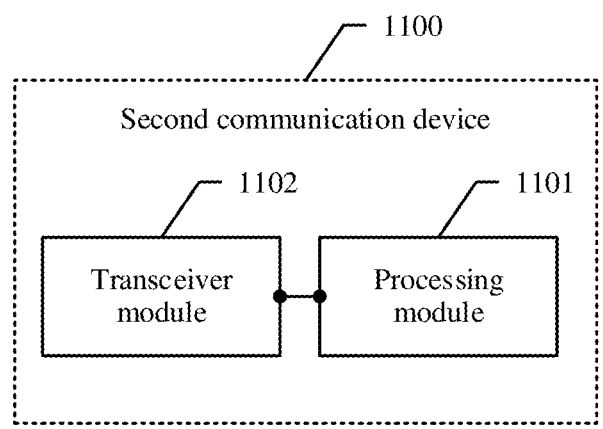
FIG. 15 is a schematic diagram of a composition structure of a second communication device according to an embodiment of this application.

FIG. 15 is a schematic diagram of a composition structure of a second communication device according to an embodiment of this application. The second communication device 1100 includes a processing module 1101 and a transceiver module 1102.

The processing module is configured to determine a reserved resource, where the reserved resource is a resource indicated by the second communication device to a first communication device and unavailable to the first communication device.

The processing module is configured to determine first information, where first information is used to indicate a first resource pattern and indicate the reserved resource determined by using the first resource pattern, the first resource pattern is used to determine a position corresponding to each of N resource sets, and N is a positive integer greater than or equal to 1.

The transceiver module is configured to send the first information to the first communication device.

In some embodiments of this application, the first information includes first indication information and second indication information;
 the first indication information is used to indicate the first resource pattern; and
 the second indication information is used to indicate the reserved resource in the N resource sets indicated by the first resource pattern.

In some embodiments of this application, when the first information indicates a first state, the first resource pattern indicates a first position corresponding to the N resource sets; and
 when the first information indicates a second state, the first resource pattern indicates a second position corresponding to the N resource sets.

In some embodiments of this application, when the first information indicates a third state, the first resource pattern indicates a first position corresponding to the N resource sets;
 when the first information indicates a fourth state, the first resource pattern indicates a second position corresponding to the N resource sets; and
 when the first information indicates a fifth state, the first resource pattern indicates a third position corresponding to the N resource sets.

In some embodiments of this application, when the first information indicates a sixth state, the first resource pattern indicates that the reserved resource does not exist in the N resource sets.

In some embodiments of this application, when a frequency range applicable to the first resource pattern is less than or equal to a first frequency value, the first position is $\{2, 4, 8, 10\}+14n$, where n=0, and $\{2, 4, 8, 10\}$ indicates that a value is 2, 4, 8, or 10; or
 when the frequency range is greater than the first frequency value, the first position is $\{2, 4, 8, 10\}+14n$, where n=0 or 1, and $\{2, 4, 8, 10\}$ indicates that a value is 2, 4, 8, or 10.

In some embodiments of this application, when a frequency range applicable to the first resource pattern is less than or equal to a first frequency value, the first position is $\{2, 8\}+14n$, where n=0, and $\{2, 8\}$ indicates that a value is 2 or 8; or
 when the frequency range is greater than the first frequency value, the first position is $\{2, 8\}+14n$, where n=0 or 1, and $\{2, 8\}$ indicates that a value is 2 or 8.

In some embodiments of this application, the first position is $\{2, 16\}$, where $\{2, 16\}$ indicates that a value is 2 or 16.

In some embodiments of this application, when a frequency range applicable to the first resource pattern is less than or equal to a first frequency value, the second position is $\{1, 4\}+7n$, where n=0 or 1, and $\{1, 4\}$ indicates that a value is 1 or 4; or
 when the frequency range is greater than the first frequency value, the second position is $\{1, 4\}+7n$, where n=0, 1, 2, or 3, and $\{1, 4\}$ indicates that a value is 1 or 4.

In some embodiments of this application, when a frequency range applicable to the first resource pattern is less than or equal to a first frequency value, the third position is $\{2, 8\}+14n$, where n=0 or 1, and $\{2, 8\}$ indicates that a value is 2 or 8; or when the frequency range is greater than the first frequency value, the third position is $\{2, 8\}+14n$, where $n=0$, 1, 2, or 3, and $\{2, 8\}$ indicates that a value is 2 or 8.

In some embodiments of this application, when a frequency range applicable to the first resource pattern is less than or equal to a first frequency value, the third position is $\{2, 16\}+28n$, where $n=0$, and $\{2, 16\}$ indicates that a value is 2 or 16; or when the frequency range is greater than the first frequency value, the third position is $\{2, 16\}+28n$, where $n=0$ or 1, and $\{2, 16\}$ indicates that a value is 2 or 16.

In some embodiments of this application, the first information further includes one or more of the following information: period information, offset information, and subcarrier spacing information;

the period information is used to indicate a period value corresponding to the first resource pattern;

the offset information is used to indicate an offset value of the position corresponding to each resource set; and the subcarrier spacing information is used to indicate a subcarrier spacing corresponding to each resource set.

It can be learned from the examples in the foregoing embodiment that, in this embodiment of this application, after the second communication device determines the reserved resource, the second communication device may obtain the first information, and use the first information to indicate the first resource pattern, and may further use the first information to indicate the reserved resource determined by using the first resource pattern. The second communication device sends the first information to the first communication device, so that the first communication device can determine the first resource pattern and indicate the reserved resource determined by using the first resource pattern. Finally, the first communication device may transmit a signal without using the reserved resource. In this embodiment of this application, the first information sent by the second communication device indicates the first resource pattern, and the reserved resource is further determined by using the positions corresponding to the N resource sets indicated by the first resource pattern. In this embodiment of this application, the resource pattern is indicated, so that a waste of resources can be reduced, and signaling overheads during resource indication are reduced.

An embodiment of this application further provides a computer storage medium. The computer storage medium stores a program. The program is executed to perform some or all of the steps recorded in the method embodiments.

Figure 16:
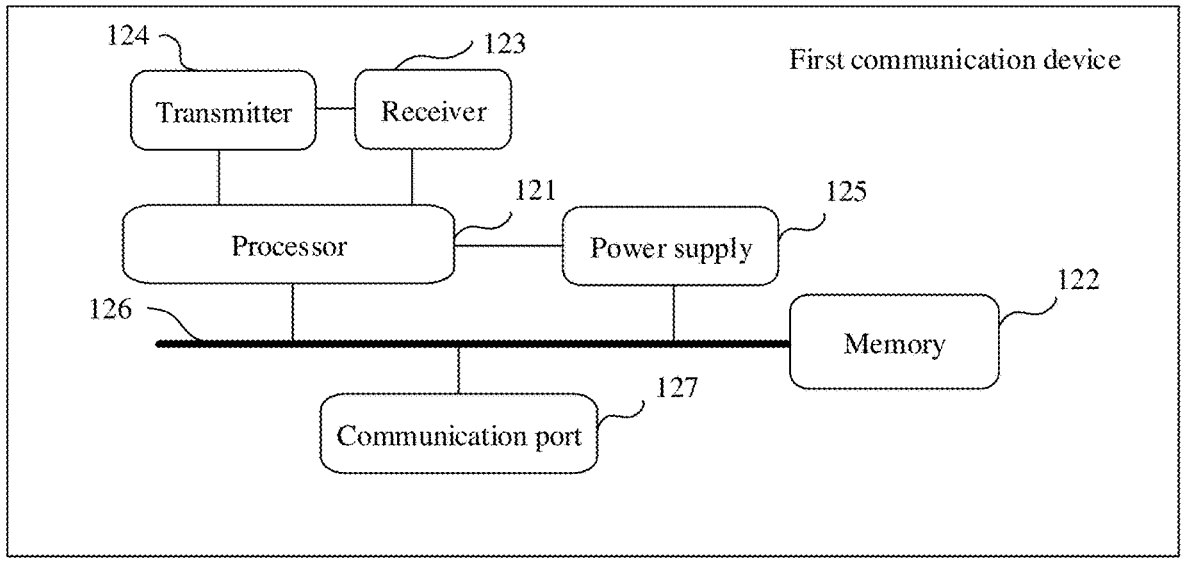
FIG. 16 is a schematic diagram of a composition structure of a first communication device according to an embodiment of this application.

FIG. 16 is a schematic diagram of a structure of another device according to an embodiment of this application. The device is a first communication device, and the first communication device may include a processor 121 (for example, a CPU), a memory 122, a transmitter 124, and a receiver 123. The transmitter 124 and the receiver 123 are coupled to the processor 121, and the processor 121 controls a sending action of the transmitter 124 and a receiving action of the receiver 123. The memory 122 may include a high-speed RAM memory, or may further include a non-volatile memory NVM, for example, at least one magnetic disk memory. The memory 122 may store various instructions, to complete various processing functions and implement the method steps in the embodiments of this application. Optionally, the first communication device in this embodiment of this application may further include one or more of a power supply 125, a communication bus 126, and a communication port 127. The receiver 123 and the transmitter 124 may be integrated into a transceiver of the first communication device, or may be independent receive and transmit antennas of the first communication device. The communication bus 126 is configured to implement a communication connection between elements. The communication port 127 is configured to implement a connection and communication between the first communication device and another peripheral.

In this embodiment of this application, the memory 122 is configured to store computer-executable program code, and the program code includes instructions. When the processor 121 executes the instructions, the instructions enable the processor 121 to perform a processing action of the first communication device in the foregoing method embodiments, and enable the transmitter 124 to perform a sending action of the first communication device in the foregoing method embodiments. Implementation principles and technical effects thereof are similar, and details are not described herein again.

Figure 17:
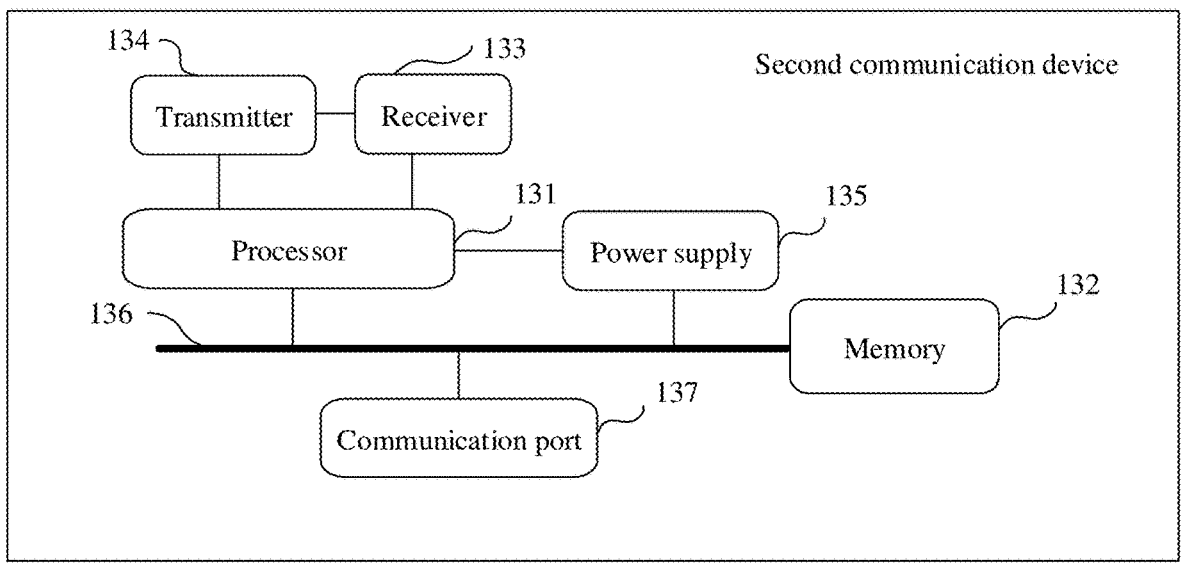
FIG. 17 is a schematic diagram of a composition structure of a second communication device according to an embodiment of this application.

FIG. 17 is a schematic diagram of a structure of another device according to an embodiment of this application. The device is a second communication device, and the second communication device may include a processor (for example, a CPU) 131, a memory 132, a receiver 133, and a transmitter 134. The receiver 133 and the transmitter 134 are coupled to the processor 131, and the processor 131 controls a receiving action of the receiver 133 and a sending action of the transmitter 134. The memory 132 may include a high-speed RAM memory, or may further include a non-volatile memory NVM, for example, at least one magnetic disk memory. The memory 132 may store various instructions, to complete various processing functions and implement the method steps in the embodiments of this application. Optionally, the second communication device in this embodiment of this application may further include one or more of a power supply 135, a communication bus 136, and a communication port 137. The receiver 133 and the transmitter 134 may be integrated into a transceiver of the second communication device, or may be independent receive and transmit antennas of the second communication device. The communication bus 136 is configured to implement a communication connection between elements. The communication port 137 is configured to implement a connection and communication between the second network device and another peripheral.

In another possible design, when the communication device is a terminal device or a chip in a network device, the chip includes a processing unit and a communication unit. The processing unit may be, for example, a processor. The communication unit may be, for example, an input/output interface, a pin, or a circuit. The processing unit may execute computer-executable instructions stored in a storage unit, so that a chip in the terminal performs the wireless communication method according to any one of the implementations of the first aspect. Optionally, the storage unit is a storage unit in the chip, for example, a register or a cache. Alternatively, the storage unit may be a storage unit that is in the terminal and that is located outside the chip, for example, a read-only memory (read-only memory, ROM) or another type of static storage device that can store static information and instructions, for example, a random access memory (random access memory, RAM).

The processor mentioned anywhere above may be a general-purpose central processing unit (CPU), a microprocessor, an application-specific integrated circuit (application-specific integrated circuit, ASIC), or one or more integrated circuits for controlling program execution of the wireless communication method according to the first aspect.

In addition, it should be noted that the described apparatus embodiments are merely examples. The units described as separate parts may or may not be physically separate, and parts displayed as units may or may not be physical units, and may be located at one position, or may be distributed on a plurality of network units. Some or all the modules may be selected according to an actual need to achieve the objectives of the solutions of the embodiments. In addition, in the accompanying drawings of the apparatus embodiments provided in this application, connection relationships between the modules indicate that the modules have communication connections with each other, which may be specifically implemented as one or more communication buses or signal cables. A person of ordinary skill in the art may understand and implement the embodiments without creative efforts.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication device, comprising:
   at least one processor; and
   one or more memories coupled to the at least one processor and storing programming instructions, wherein the at least one processor is configured to execute the instructions to:
   receive first information sent by a further communication device, wherein the first information comprises first indication information which indicates a first resource pattern based on which a reserved resource is determinable, the first resource pattern indicates a plurality of positions each corresponding to one of N resource sets, and N is a positive integer greater than a number of bits in the first indication information;
   determine the reserved resource based on the plurality of positions corresponding to the N resource sets and indicated by the first resource pattern, wherein the reserved resource is a resource unavailable to the communication device; and
   determine not to transmit a signal by using the reserved resource,
   wherein
   in response to the first indication information indicating a first state, the first resource pattern indicates a first position corresponding to the N resource sets; or
   in response to the first indication information indicating a second state, the first resource pattern indicates a second position corresponding to the N resource sets; and
   the first position is $\{2, 4, 8, 10\}+14n$, wherein
      $\{2, 4, 8, 10\}$ indicates a value of 2, 4, 8, or 10,
      $n=0$ corresponding to a frequency range applicable to the first resource pattern being less than or equal to a first frequency value, and
      $n=0$ or 1 corresponding to the frequency range being greater than the first frequency value; or
   the first position is $\{2, 8\}+14n$, wherein
      $\{2, 8\}$ indicates a value of 2 or 8,
      $n=0$ corresponding to a frequency range applicable to the first resource pattern being less than or equal to a first frequency value, and
      $n=0$ or 1 corresponding to the frequency range being greater than the first frequency value; or
   the second position is $\{1, 4\}+7n$, wherein
      $\{1, 4\}$ indicates a value of 1 or 4,
      $n=0$ or 1 corresponding to a frequency range applicable to the first resource pattern being less than or equal to a first frequency value, and
      $n=0$, 1, 2, or 3 corresponding to the frequency range being greater than the first frequency value.

2. The communication device according to claim 1, wherein
   the first information further comprises second indication information; and
   the second indication information
      indicates at least one resource set in the N resource sets indicated by the first resource pattern as the reserved resource, and
      indicates at least one another resource set in the N resource sets indicated by the first resource pattern as not the reserved resource.

3. The communication device according to claim 1, wherein
in response to the first indication information indicating a third state, the first resource pattern indicates a first position corresponding to the N resource sets;
in response to the first indication information indicating a fourth state, the first resource pattern indicates a second position corresponding to the N resource sets; and
in response to the first indication information indicating a fifth state, the first resource pattern indicates a third position corresponding to the N resource sets.

4. The communication device according to claim 3, wherein
in response to the first indication information indicating a sixth state, the first resource pattern indicates that the reserved resource does not exist in the N resource sets.

5. The communication device according to claim 3, wherein
the third position is $\{2, 8\}+14n$, wherein
$\{2, 8\}$ indicates a value of 2 or 8,
n=0 or 1 corresponding to a frequency range applicable to the first resource pattern being less than or equal to a first frequency value, and
n=0, 1, 2, or 3 corresponding to the frequency range being greater than the first frequency value; or
the third position is $\{2, 16\}+28n$, wherein
$\{2, 16\}$ indicates a value of 2 or 16,
n=0 corresponding to a frequency range applicable to the first resource pattern being less than or equal to a first frequency value, and
n=0 or 1 corresponding to the frequency range being greater than the first frequency value.

6. The communication device according to claim 1, wherein
the first information further comprises at least one of period information, offset information, or subcarrier spacing information;
the period information indicates a period value corresponding to the first resource pattern;
the offset information indicates an offset value of the position corresponding to each resource set; and
the subcarrier spacing information indicates a subcarrier spacing corresponding to each resource set.

7. The communication device according to claim 1, wherein
the number of bits in the first indication information is 1 or 2, and
N is 4 or greater.

8. A communication device, comprising:
at least one processor; and
one or more memories coupled to the at least one processor and storing programming instructions, wherein the at least one processor is configured to execute the instructions to:
determine a reserved resource, wherein the reserved resource is a resource to be indicated by the communication device to a further communication device and unavailable to the further communication device;
determine first information, wherein the first information comprises first indication information which indicates a first resource pattern based on which the reserved resource is determinable, the first resource pattern indicates a plurality of positions each corresponding to one of N resource sets, and N is a positive integer greater than a number of bits in the first indication information; and
send the first information to the further communication device,
wherein
in response to the first indication information indicating a first state, the first resource pattern indicates a first position corresponding to the N resource sets; or
in response to the first indication information indicating a second state, the first resource pattern indicates a second position corresponding to the N resource sets; and
the first position is $\{2, 4, 8, 10\}+14n$, wherein
$\{2, 4, 8, 10\}$ indicates a value of 2, 4, 8, or 10,
n=0 corresponding to a frequency range applicable to the first resource pattern being less than or equal to a first frequency value, and
n=0 or 1 corresponding to the frequency range being greater than the first frequency value; or
the first position is $\{2, 8\}+14n$, wherein
$\{2, 8\}$ indicates a value of 2 or 8,
n=0 corresponding to a frequency range applicable to the first resource pattern being less than or equal to a first frequency value, and
n=0 or 1 corresponding to the frequency range being greater than the first frequency value; or
the second position is $\{1, 4\}+7n$, wherein
$\{1, 4\}$ indicates a value of 1 or 4,
n=0 or 1 corresponding to a frequency range applicable to the first resource pattern being less than or equal to a first frequency value, and
n=0, 1, 2, or 3 corresponding to the frequency range being greater than the first frequency value.

9. The communication device according to claim 8, wherein
in response to the first indication information indicating a third state, the first resource pattern indicates a first position corresponding to the N resource sets;
in response to the first indication information indicating a fourth state, the first resource pattern indicates a second position corresponding to the N resource sets; and
in response to the first indication information indicating a fifth state, the first resource pattern indicates a third position corresponding to the N resource sets.

10. The communication device according to claim 9, wherein
in response to the first indication information indicating a sixth state, the first resource pattern indicates that the reserved resource does not exist in the N resource sets.

11. The communication device according to claim 9, wherein
the third position is $\{2, 8\}+14n$, wherein
$\{2, 8\}$ indicates a value of 2 or 8,
n=0 or 1 corresponding to a frequency range applicable to the first resource pattern being less than or equal to a first frequency value, and
n=0, 1, 2, or 3 corresponding to the frequency range being greater than the first frequency value; or
the third position is $\{2, 16\}+28n$, wherein
$\{2, 16\}$ indicates a value of 2 or 16,
n=0 corresponding to a frequency range applicable to the first resource pattern being less than or equal to a first frequency value, and
n=0 or 1 corresponding to the frequency range being greater than the first frequency value.

12. A resource indication method, comprising:
receiving, by a first communication device, first information sent by a second communication device, wherein the first information comprises first indication information which indicates a first resource pattern based on which a reserved resource is determinable, the first resource pattern indicates a plurality of positions each corresponding to one of N resource sets, and N is a positive integer greater than a number of bits in the first indication information;

determining, by the first communication device, the reserved resource based on the plurality of positions corresponding to the N resource sets and indicated by the first resource pattern, wherein the reserved resource is a resource unavailable to the first communication device; and determining, by the first communication device, not to transmit a signal by using the reserved resource, wherein the first indication information indicates a first state or a second state;

in response to the first indication information indicating the first state, the first resource pattern indicates a first position corresponding to the N resource sets; or in response to the first indication information indicating the second state, the first resource pattern indicates a second position corresponding to the N resource sets; and the first position is $\{2, 4, 8, 10\}+14n$, wherein
  $\{2, 4, 8, 10\}$ indicates a value of 2, 4, 8, or 10,
  $n=0$ corresponding to a frequency range applicable to the first resource pattern being less than or equal to a first frequency value, and
  $n=0$ or 1 corresponding to the frequency range being greater than the first frequency value; or the first position is $\{2, 8\}+14n$, wherein
  $\{2, 8\}$ indicates a value of 2 or 8,
  $n=0$ corresponding to a frequency range applicable to the first resource pattern being less than or equal to a first frequency value, and
  $n=0$ or 1 corresponding to the frequency range being greater than the first frequency value; or the second position is $\{1, 4\}+7n$, wherein
  $\{1, 4\}$ indicates a value of 1 or 4,
  $n=0$ or 1 corresponding to a frequency range applicable to the first resource pattern being less than or equal to a first frequency value, and
  $n=0, 1, 2,$ or 3 corresponding to the frequency range being greater than the first frequency value.

13. A resource indication method, comprising:

determining, by a second communication device, a reserved resource, wherein the reserved resource is a resource to be indicated by the second communication device to a first communication device and unavailable to the first communication device;

determining, by the second communication device, first information, wherein the first information comprises first indication information which indicates a first resource pattern based on which the reserved resource is determinable, the first resource pattern indicates a plurality of positions each corresponding to one of N resource sets, and N is a positive integer greater than a number of bits in the first indication information; and sending, by the second communication device, the first information to the first communication device, wherein the first indication information indicates a first state or a second state;

in response to the first indication information indicating the first state, the first resource pattern indicates a first position corresponding to the N resource sets; or in response to the first indication information indicating the second state, the first resource pattern indicates a second position corresponding to the N resource sets; and the first position is $\{2, 4, 8, 10\}+14n$, wherein
  $\{2, 4, 8, 10\}$ indicates a value of 2, 4, 8, or 10,
  $n=0$ corresponding to a frequency range applicable to the first resource pattern being less than or equal to a first frequency value, and
  $n=0$ or 1 corresponding to the frequency range being greater than the first frequency value; or the first position is $\{2, 8\}+14n$, wherein
  $\{2, 8\}$ indicates a value of 2 or 8,
  $n=0$ corresponding to a frequency range applicable to the first resource pattern being less than or equal to a first frequency value, and
  $n=0$ or 1 corresponding to the frequency range being greater than the first frequency value; or the second position is $\{1, 4\}+7n$, wherein
  $\{1, 4\}$ indicates a value of 1 or 4,
  $n=0$ or 1 corresponding to a frequency range applicable to the first resource pattern being less than or equal to a first frequency value, and
  $n=0, 1, 2,$ or 3 corresponding to the frequency range being greater than the first frequency value.

* * * * *